US012572335B2

(12) United States Patent
Ngiam et al.

(10) Patent No.: US 12,572,335 B2
(45) Date of Patent: *Mar. 10, 2026

(54) UTILITY SYSTEM FOR AUTOMATED CODE GENERATION AND EXECUTION

(71) Applicant: Dependable AI, Inc., Los Altos, CA (US)

(72) Inventors: Jiquan Ngiam, Los Altos, CA (US); Bo Zhi See, Redwood City, CA (US); Vijay Vasudevan, Los Altos Hills, CA (US); Joshua Newman, Mountain View, CA (US); Jaran Charumilind, Palo Alto, CA (US); Marc Rasi, Sunnyvale, CA (US)

(73) Assignee: Dependable AI, Inc., Los Altos, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 18/239,511

(22) Filed: Aug. 29, 2023

(65) Prior Publication Data

US 2025/0045026 A1 Feb. 6, 2025

Related U.S. Application Data

(63) Continuation of application No. 18/228,216, filed on Jul. 31, 2023.

(51) Int. Cl.
    G06F 8/35        (2018.01)
    G06F 11/3698     (2025.01)
(52) U.S. Cl.
    CPC ............ *G06F 8/35* (2013.01); *G06F 11/3698* (2025.01)
(58) Field of Classification Search
    None
    See application file for complete search history.

(56) References Cited

U.S. PATENT DOCUMENTS

| | | | |
|---|---|---|---|
| 2014/0156325 A1* | 6/2014 | Stewart ............ | G06Q 10/06311 |
| | | | 705/7.13 |
| 2017/0270455 A1* | 9/2017 | Chi ................ | G06Q 10/063112 |
| (Continued) | | | |

OTHER PUBLICATIONS

Cai et al., "Low-code LLM: Visual Programming over LLMs," arXiv, 2023. (Year: 2023).*
Raman et al., "Planning with Large Language Models via Corrective Re-prompting," openReview.net, 2022. (Year: 2022).*
Ge et al., "OpenAGI: When LLM Meets Domain Experts," arXiv, Jun. 18, 2023. (Year: 2023).*
Sun et al., "AdaPlanner: Adaptive Planning from Feedback with Language Models," arXiv, May 26, 2023. (Year: 2023).*
(Continued)

*Primary Examiner* — Ryan D. Coyer
(74) *Attorney, Agent, or Firm* — Schwegman Lundberg & Woessner, P.A.

(57) ABSTRACT

Methods, systems, and computer programs are presented for implementing a tool that generates and executes the code in a controlled environment to satisfy user requests entered as text prompts. One method includes receiving a user prompt with a user request received in a user interface (UI), generating a first Large Language Model (LLM) prompt to create a plan, and receiving the plan from an LLM, the plan comprising text describing a sequence of operations. The method further includes generating a second LLM prompt, to create code, specifying which code instructions are permitted in the created code. Further, the method receives the code from the LLM that received the second LLM prompt, and executes the code in a controlled environment. Further, the results generated by executing the code are presented in the UI.

19 Claims, 21 Drawing Sheets

(56) References Cited

U.S. PATENT DOCUMENTS

| | | | |
|---|---|---|---|
| 2023/0188577 A1* | 6/2023 | Venkiteswaran | H04L 65/403<br>709/204 |
| 2024/0095077 A1* | 3/2024 | Singh | G06F 9/5027 |
| 2024/0253211 A1* | 8/2024 | Rose | B25J 19/02 |
| 2024/0319970 A1* | 9/2024 | Watson | G06F 8/35 |
| 2024/0385832 A1* | 11/2024 | Nyswonger | G06F 8/73 |
| 2024/0403428 A1* | 12/2024 | Lal | G06F 21/566 |
| 2024/0414190 A1* | 12/2024 | Lal | H04L 63/1425 |
| 2024/0430173 A1* | 12/2024 | Coudert | H04W 16/18 |
| 2025/0045024 A1 | 2/2025 | Ngiam et al. | |
| 2025/0045027 A1 | 2/2025 | Ngiam et al. | |

OTHER PUBLICATIONS

Valmeekam et al., "On the Planning Abilities of Large Language Models—A Critical Investigation," arXiv, May 25, 2023. (Year: 2023).*

Zamfrescu-Pereira et al., "Why Johnny Can't Prompt: How Non-AI Experts Try (and Fail) to Design LLM Prompts," ACM, Apr. 28, 2023. (Year: 2023).*

"U.S. Appl. No. 18/228,216, Non Final Office Action mailed Jun. 18, 2025", 17 pgs.

"U.S. Appl. No. 18/242,417, Non Final Office Action mailed Jun. 18, 2025", 19 pgs.

* cited by examiner

500

RECEIVE USER PROMPT                              ⌇ 502

GENERATE FIRST LLM PROMPT TO
GENERATE HIGH-LEVEL PLAN                         ⌇ 504

INPUT FIRST LLM PROMPT TO LLM                    ⌇ 506

GENERATE SECOND LLM PROMPT TO
GENERATE CODE                                    ⌇ 508

INPUT SECOND LLM PROMPT TO LLM                   ⌇ 510

EXECUTE CODE                                     ⌇ 512

PROVIDE RESULTS                                  ⌇ 514

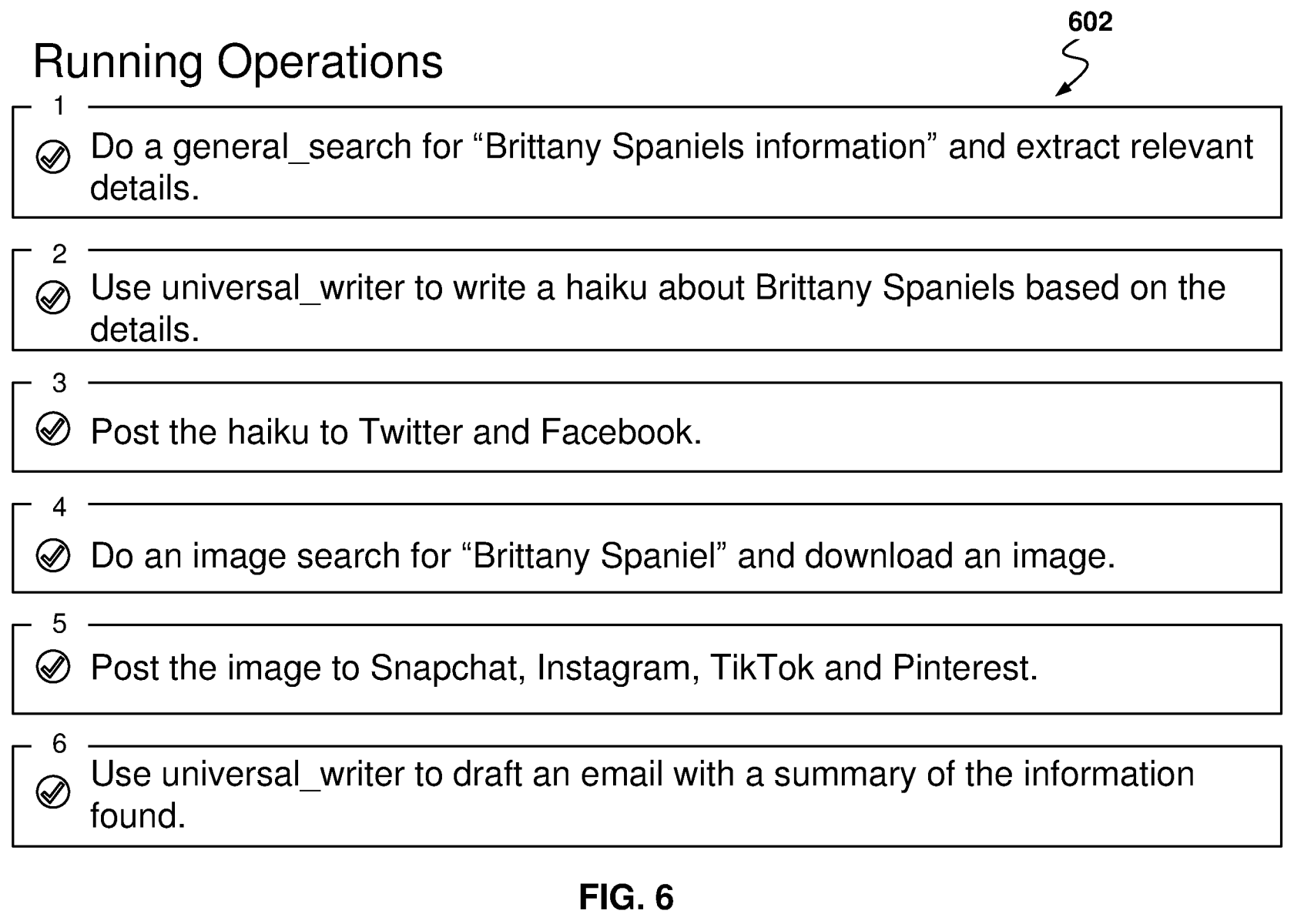

Running Operations

602

1. Do a general_search for "Brittany Spaniels information" and extract relevant details.

2. Use universal_writer to write a haiku about Brittany Spaniels based on the details.

3. Post the haiku to Twitter and Facebook.

4. Do an image search for "Brittany Spaniel" and download an image.

5. Post the image to Snapchat, Instagram, TikTok and Pinterest.

6. Use universal_writer to draft an email with a summary of the information found.

FIG. 6

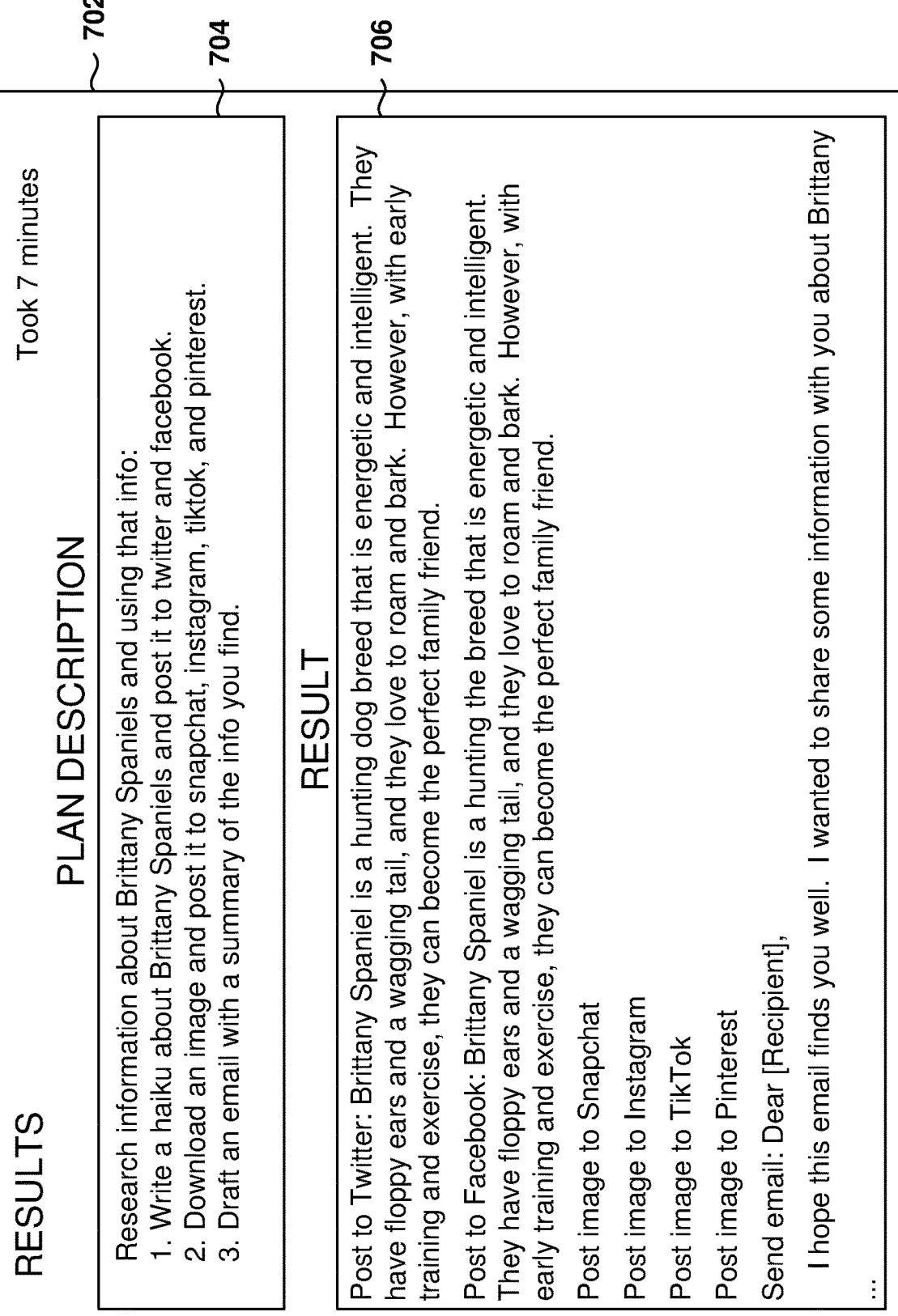

RESULTS

Took 7 minutes

PLAN DESCRIPTION

Research information about Brittany Spaniels and using that info:
1. Write a haiku about Brittany Spaniels and post it to twitter and facebook.
2. Download an image and post it to snapchat, instagram, tiktok, and pinterest.
3. Draft an email with a summary of the info you find.

RESULT

Post to Twitter: Brittany Spaniel is a hunting dog breed that is energetic and intelligent. They have floppy ears and a wagging tail, and they love to roam and bark. However, with early training and exercise, they can become the perfect family friend.

Post to Facebook: Brittany Spaniel is a hunting the breed that is energetic and intelligent. They have floppy ears and a wagging tail, and they love to roam and bark. However, with early training and exercise, they can become the perfect family friend.

Post image to Snapchat

Post image to Instagram

Post image to TikTok

Post image to Pinterest

Send email: Dear [Recipient],

I hope this email finds you well. I wanted to share some information with you about Brittany

TASK MARKETPLACE

1402

1404

| TASK | DESCRIPTION | INPUT | OUTPUT | CREATOR |
|------|-------------|-------|--------|---------|
| universal_writer | Summarizes information | Text to be summarized | Text (Summary) | system |
| data_extractor | Extracts data | Text with instructions on data to extract | Extracted text | system |
| get_web_content | Access webpage | URL | HTML (webpage) | Andre |
| get_news_today | Retrieves news headlines | N/A | Text (Summary of news) | Jose |
| get_stock_quotes | Retrieves market prices of stocks | Text list of stock IDs | Excel table with stock information | Mary |
| email_me_today_calendar | Access Outlook calendar and emails daily appointments | Text (user email ID) | Sends email with appointments | Peter |
| ⋯ | | | | |

FIG. 14

GENERATING CODE DURING PROGRAM EXECUTION

1502

```
# comment 1
Function 1
......
# comment 2
Function 2
...
# generate new code
code=generate_lp_code("find patents associated
                       with heart medical inserts")
...
# execute generated code
result=run_lp_code (code)
...
```

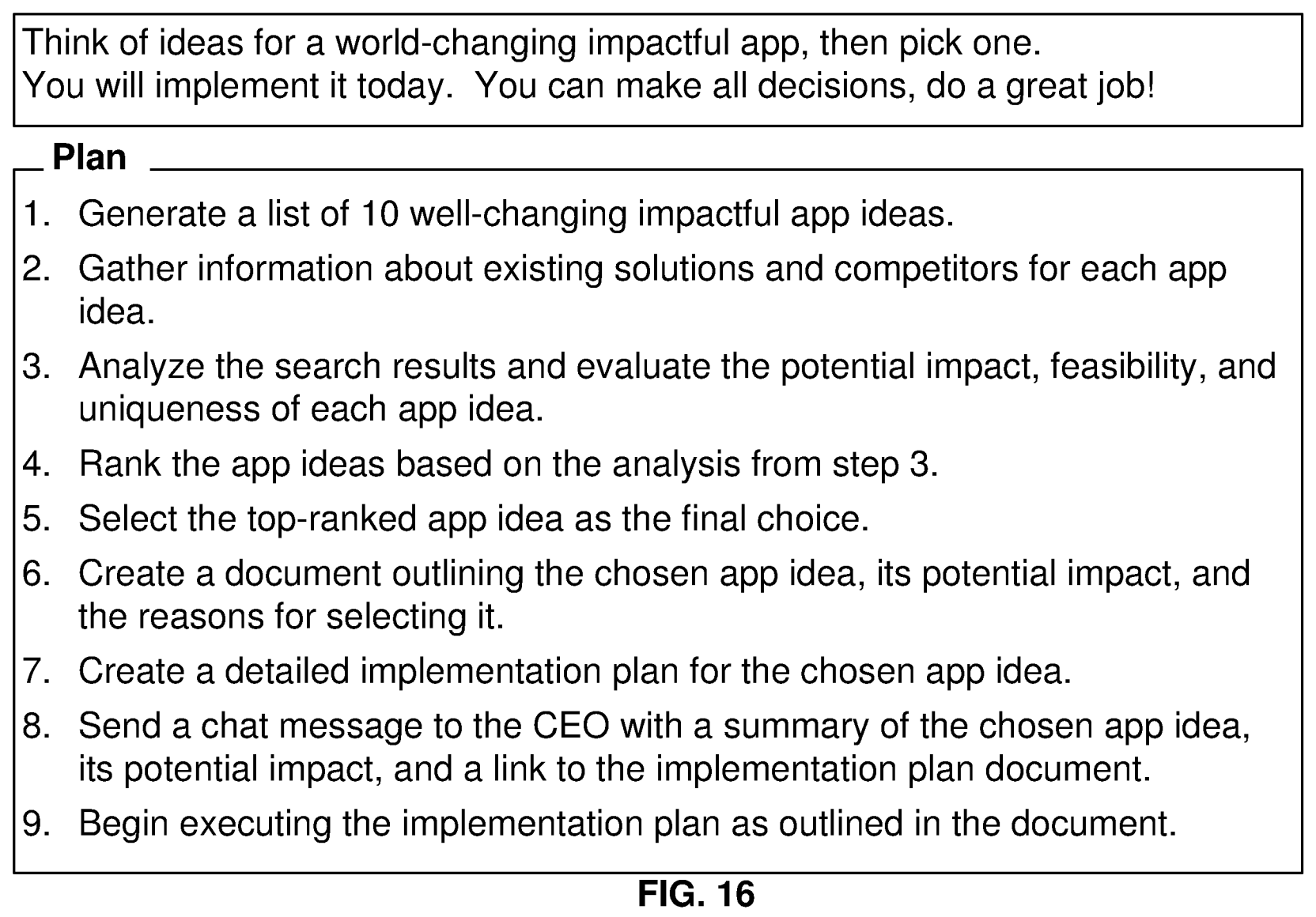

Think of ideas for a world-changing impactful app, then pick one. You will implement it today. You can make all decisions, do a great job!

Plan

1. Generate a list of 10 well-changing impactful app ideas.

2. Gather information about existing solutions and competitors for each app idea.

3. Analyze the search results and evaluate the potential impact, feasibility, and uniqueness of each app idea.

4. Rank the app ideas based on the analysis from step 3.

5. Select the top-ranked app idea as the final choice.

6. Create a document outlining the chosen app idea, its potential impact, and the reasons for selecting it.

7. Create a detailed implementation plan for the chosen app idea.

8. Send a chat message to the CEO with a summary of the chosen app idea, its potential impact, and a link to the implementation plan document.

9. Begin executing the implementation plan as outlined in the document.

FIG. 16

CREATED DOCUMENT

Purpose: To connect volunteers with local organizations in need of help.

Target audience: Individuals looking to volunteer in their community.

Features and functionalities:

- User registration and logging

- Volunteer opportunities search and filtering

- Volunteer opportunity details and sign-up

- Organization registration and login

- Organization profile creation and management

- Volunteer management and communication

- In-app messaging system

- Rating and review system

- Push notifications

Timeline:

- Planning and research: 1 month

- Design and prototyping: 2 months

- Development: 6 months

- Testing and quality assurance: 1 month

Development team roles and responsibilities:

- Project manager: oversees the entire project and ensures deadlines are met

Figure 18:
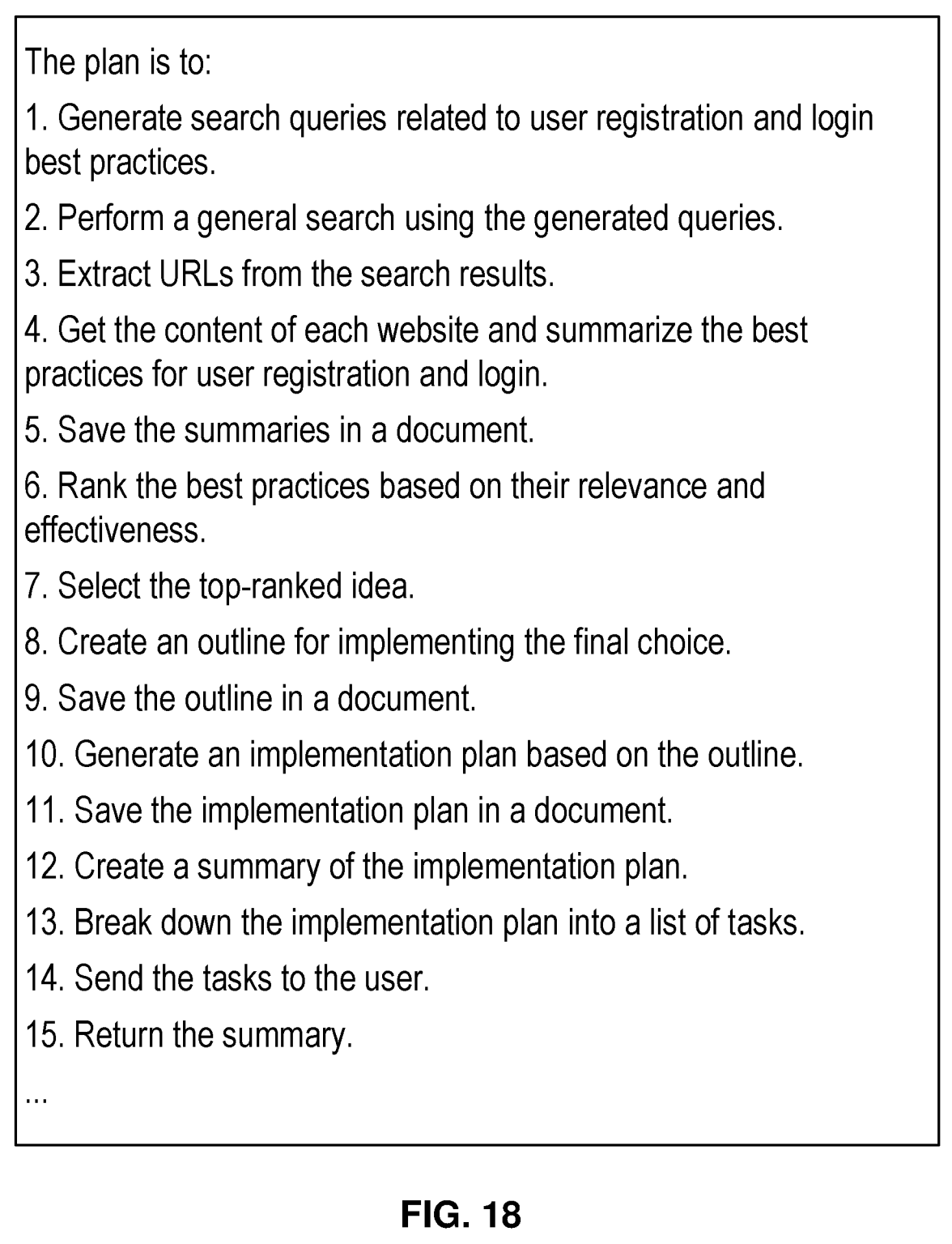

The plan is to:

1. Generate search queries related to user registration and login best practices.

2. Perform a general search using the generated queries.

3. Extract URLs from the search results.

4. Get the content of each website and summarize the best practices for user registration and login.

5. Save the summaries in a document.

6. Rank the best practices based on their relevance and effectiveness.

7. Select the top-ranked idea.

8. Create an outline for implementing the final choice.

9. Save the outline in a document.

10. Generate an implementation plan based on the outline.

11. Save the implementation plan in a document.

12. Create a summary of the implementation plan.

13. Break down the implementation plan into a list of tasks.

14. Send the tasks to the user.

15. Return the summary.

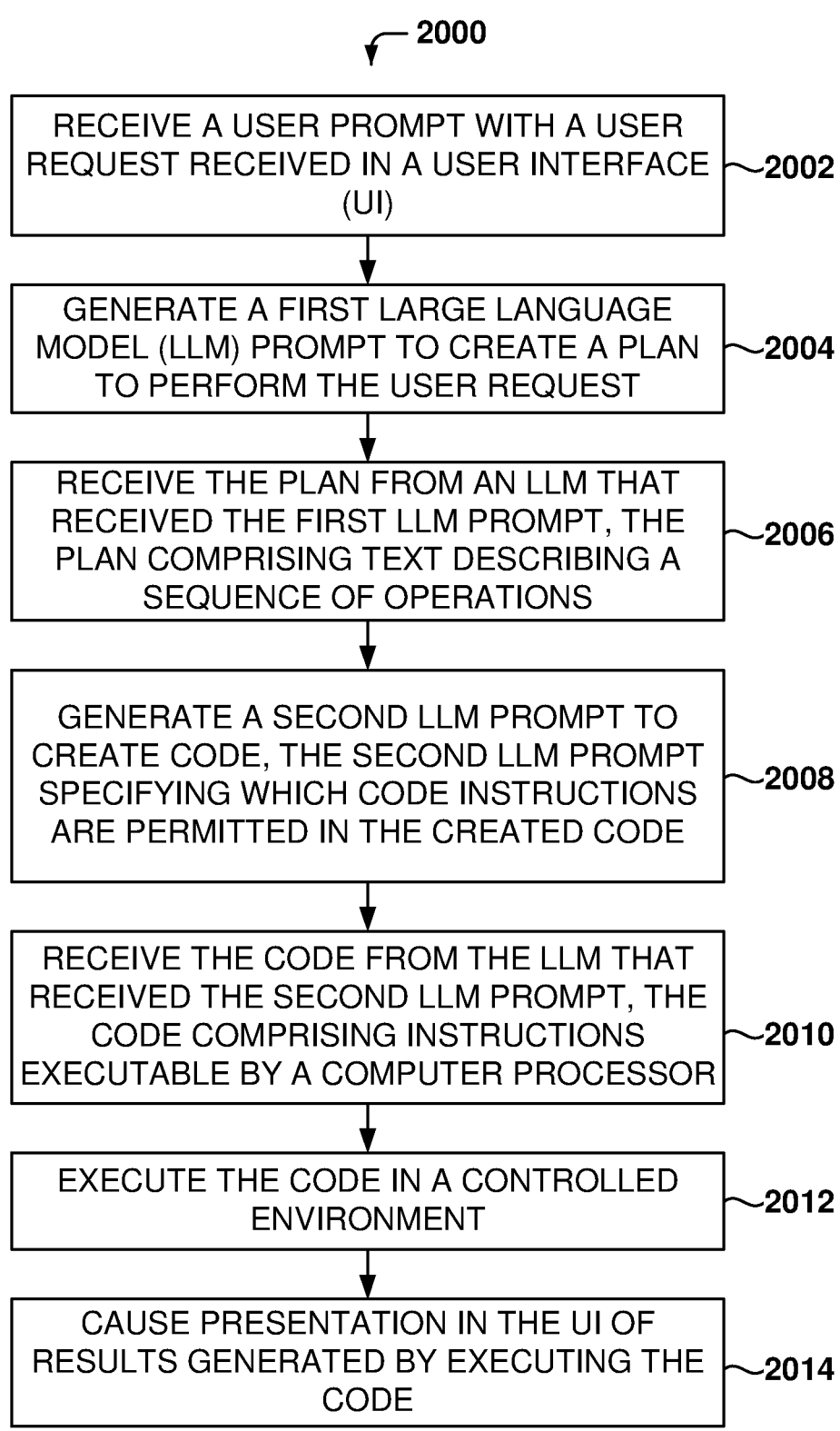

2000

RECEIVE A USER PROMPT WITH A USER REQUEST RECEIVED IN A USER INTERFACE (UI) — 2002

GENERATE A FIRST LARGE LANGUAGE MODEL (LLM) PROMPT TO CREATE A PLAN TO PERFORM THE USER REQUEST — 2004

RECEIVE THE PLAN FROM AN LLM THAT RECEIVED THE FIRST LLM PROMPT, THE PLAN COMPRISING TEXT DESCRIBING A SEQUENCE OF OPERATIONS — 2006

GENERATE A SECOND LLM PROMPT TO CREATE CODE, THE SECOND LLM PROMPT SPECIFYING WHICH CODE INSTRUCTIONS ARE PERMITTED IN THE CREATED CODE — 2008

RECEIVE THE CODE FROM THE LLM THAT RECEIVED THE SECOND LLM PROMPT, THE CODE COMPRISING INSTRUCTIONS EXECUTABLE BY A COMPUTER PROCESSOR — 2010

EXECUTE THE CODE IN A CONTROLLED ENVIRONMENT — 2012

CAUSE PRESENTATION IN THE UI OF RESULTS GENERATED BY EXECUTING THE CODE — 2014

FIG. 20

UTILITY SYSTEM FOR AUTOMATED CODE GENERATION AND EXECUTION

CROSS-REFERENCE TO RELATED APPLICATIONS

This application is a Continuation Application under 35 USC § 120 of U.S. patent application Ser. No. 18/228, 216, entitled "Utility System for Automated Code Generation and Execution," filed on Jul. 31, 2023, and is herein incorporated by reference in its entirety.

TECHNICAL FIELD

The subject matter disclosed herein generally relates to methods, systems, and machine-readable storage media for a utility system for the automated generation and execution of computer programming code.

BACKGROUND

Software engineering gives us the ability to create, to automate. However, it has traditionally been expensive, and thus many problems and tasks at work and in people's lives have not been automated. Foundation models (FMs) are changing this equation, and it is now possible for FMs to obtain working code from requests expressed in natural language. However, FMs still need an environment to operate in (e.g., need to run pip install, copy-paste the code into a script, and work with a terminal), and there is still the need for an engineer to supervise and make sure all the pieces work together. Therefore, the benefits of FMs are not within the reach of everyone.

BRIEF DESCRIPTION OF THE DRAWINGS

Various of the appended drawings merely illustrate example embodiments of the present disclosure and cannot be considered as limiting its scope.

FIG. 6 is a UI showing the operations that are being executed, according to some example embodiments.

FIG. 7 is a UI showing the results after executing the plan, according to some example embodiments.

FIG. 14 is a sample UI for accessing the task marketplace, according to some example embodiments.

FIG. 16 is another example of the generation of the plan, according to some example embodiments.

FIG. 17 shows a document generated by the plan, according to some example embodiments.

FIG. 18 provides details on the implementation plan, according to some example embodiments.

FIG. 20 is a flowchart of a method for implementing a tool that generates and executes the code in a controlled environment to satisfy user requests entered as text prompts, according to some example embodiments.

DETAILED DESCRIPTION

Example methods, systems, and computer programs are directed to a tool that generates and executes the code in a controlled environment to satisfy user requests entered as text prompts. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, an environment to use FMs for coding and execution of the programming code is provided, where the code produced by the FMs is operated safely and reliably. In this environment, users can create tools to automate tasks in their lives using simple natural language, and these tools operate as the glue between the other utilities that users access in their work and lives.

In one aspect, FMs are used to translate requests entered as text into a plan and code that are executed by the service. The code is executed in a custom Large Language Model (LLM) Code Interpreter and Execution Environment (LCIEE) that controls the functions that may be executed, the errors that may occur, and accesses Application Programming Interfaces (APIs) to access external servers for data. LCIEE features are bundled into a cohesive service that enhances LLM's usability, versatility, and safety in coding applications, thus bringing the power of LLMs to the reach of everyone; no software engineer required to design and execute programs.

One general aspect includes a computer-implemented method that includes operations for receiving a user prompt with a user request received in a UI, generating a first LLM prompt to create a plan to perform the user request, and receiving the plan from an LLM that received the first LLM prompt, the plan comprising text describing a sequence of operations. The method further includes generating a second LLM prompt to create code, the second LLM prompt specifying which code instructions are permitted in the created code. Further, the method receives the code from the LLM that received the second LLM prompt, the code comprising instructions executable by a computer processor, and executes the code in a controlled environment, the executing the code comprising detecting an error when executing a function of the code, generating new code for the function that caused the error, and executing the new code for the function that caused the error. Further, the method includes presenting in the UI results generated by executing the code.

Figure 1:
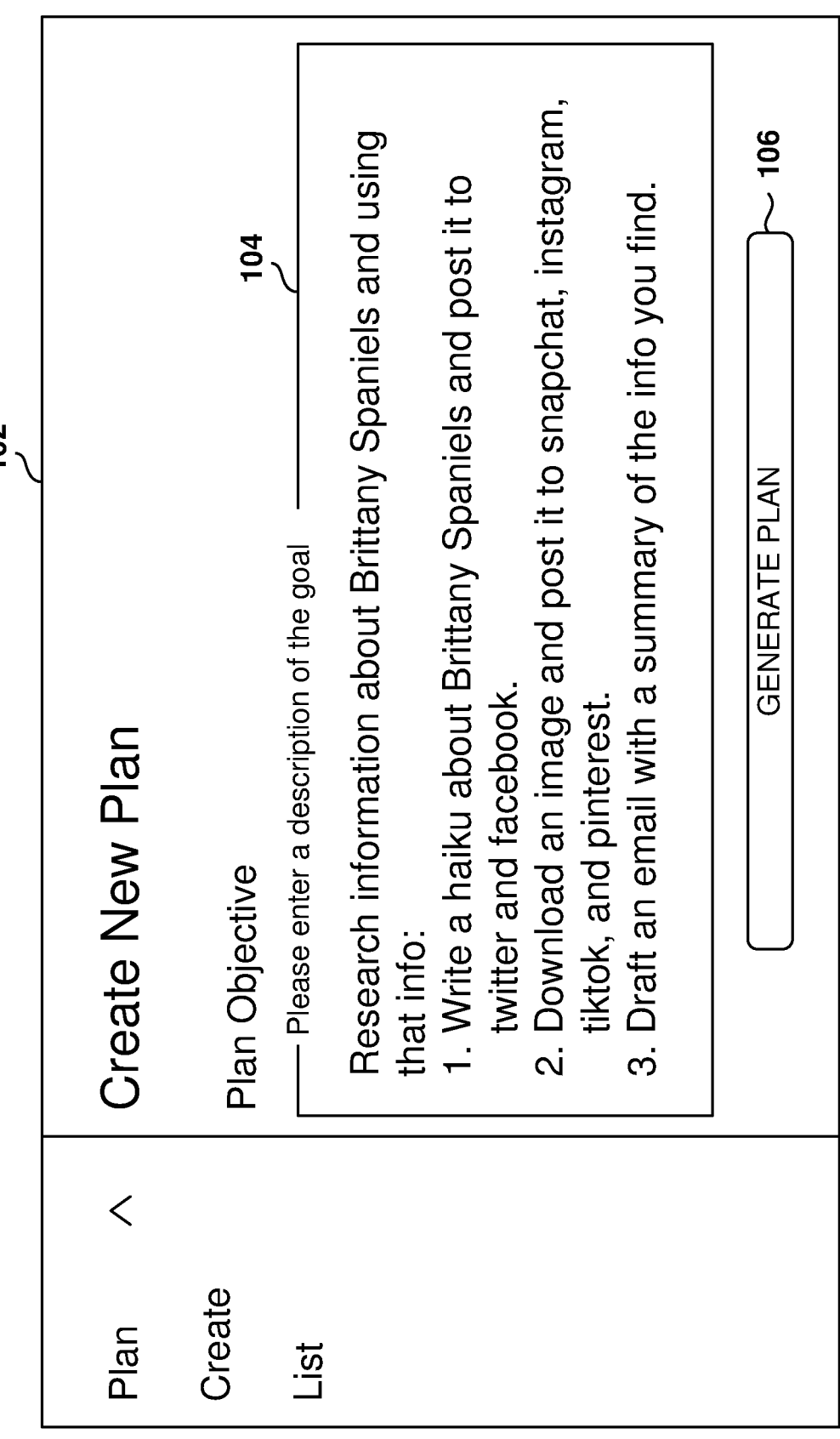
FIG. 1 is a user interface (UI) for entering a request as a prompt to generate a plan, according to some example embodiments.

FIG. 1 is a user interface (UI) 102 for entering a request as a prompt to generate a plan to perform tasks required to satisfy the request, according to some example embodiments. The UI 102 is presented when the user selects the option to create a new plan.

The user may enter a prompt in the prompt field 104 with a request entered as natural language. After the user completes the request in the prompt field 104, the user can select the option 106 to generate the plan.

In the illustrated example, the user has entered the following prompt:

Research information about Brittany Spaniels and using that info:

1. Write a haiku about Brittany Spaniels and post it to twitter and facebook.
2. Download an image and post it to snapchat, instagram, tiktok, and pinterest.
3. Draft an email with a summary of the info you find.

Thus, the user has requested a poem about a breed of dogs, Brittany Spaniels, and to post the poem in Twitter and Facebook. Further, the user has requested to download an image of the dog and post it to Snapchat, Instagram, TikTok, and Pinterest. Finally, the user has requested to draft an email with a summary of the information obtained.

A second example of a prompt would be, "Find the top articles on news.ycombinator.com and summarize them. Just read the news site directly to find the top articles." Thus, the user is requesting that LCIEE accesses a website to retrieve top articles and then provide a summary, and specifically, reading from the news site directly.

It is noted that Generative AI tools like ChatGPT provide responses based on the data used for their training, and these tools do not have the capability to perform searches or access websites to obtain information. However, LCIEE generates code that is able to perform this type of operations to access the Internet to obtain information and then process it using LLMs. Therefore, the information generated by LCIEE covers up to the most recent information available, unlike ChatGPT that only covers information in the data used to train the model. The LCIEE also permits code to retrieve and push data to other applications, allowing the user to gather and process information from their existing applications.

To better understand the embodiments described below, a few terms used in the Specification are now defined:

A USER PROMPT is text entered via the user interface that specifies a request from the user. Unless otherwise specified, a user prompt may also be referred simply as a prompt.

An LLM PROMPT is text to be used as input for an LLM.

A PLAN contains a sequence of operations to be performed in order to perform actions in the request received via the prompt. The operations can be expanded recursively to generate a list of sub-operations to be performed. The plan contains a natural-language description, also referred to as human-readable text.

CODE refers to programming instructions, to be executed by one or more processors, to execute the plan; that is, the plan is converted to code that represents the operations in the plan.

A COMMENT is a textual description embedded in the code that explains what the code is doing; the comment is not executed by the processor as a computer instruction.

The code may execute ACTIONS and FUNCTIONS.

A FUNCTION refers to a block of code that performs a specific task. A function typically takes some input values called arguments or parameters, performs a set of operations, and optionally returns a result. Functions can be of many types and may be used, for example, to calculate a value, format data, summarize data, store data, etc.

An ACTION is programming code that interacts with another computer (e.g., with the "outside world"). For example, an action may perform a function to get data from an external source via an Application Programming Interface (API).

During execution of the plan, the UI may show the current action or function being executed. Also, during execution, the UI may show the comment, associated with the current action or function, which explains what the code is doing at that moment.

A completed plan may be saved as a TASK that can be reused in the future. That is, the task is a type of plan that has already been executed or otherwise validated. The task may be saved in a TASK MARKETPLACE that stores the current list of tasks available to the user.

A SAVED TASK may be used as part of a plan in the future.

Figure 2:
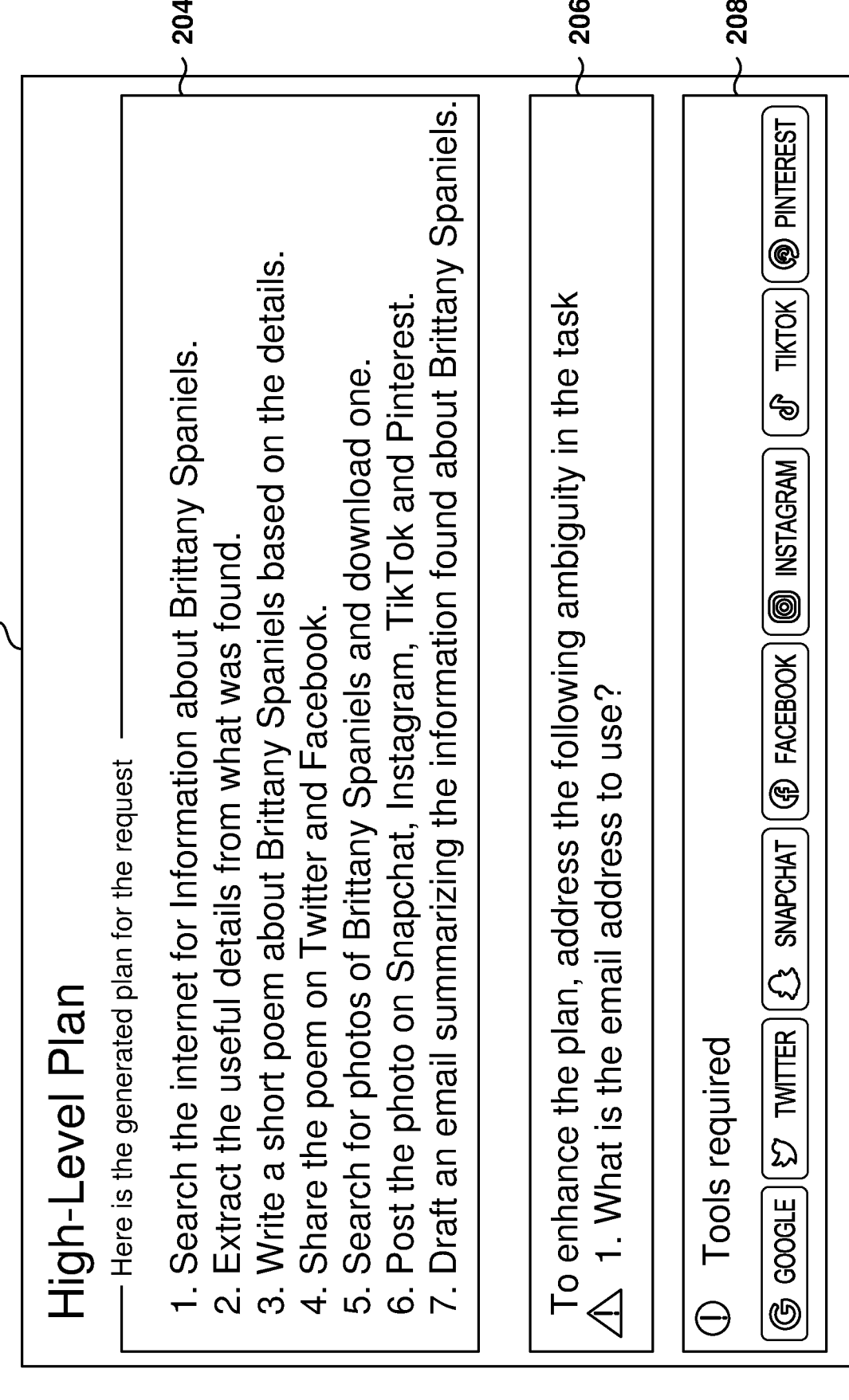
FIG. 2 is a UI showing the generated plan, according to some example embodiments.

FIG. 2 is a UI 202 showing the generated plan, according to some example embodiments. The UI 202 shows, in plan field 204, the plan generated by an LLM to satisfy the request described with reference to FIG. 1.

The generated plan includes the following operations:

1. Search the internet for Information about Brittany Spaniels.
2. Extract the useful details from what was found.
3. Write a short poem about Brittany Spaniels based on the details.
4. Share the poem on Twitter and Facebook.
5. Search for photos of Brittany Spaniels and download one.
6. Post the photo on Snapchat, Instagram, TikTok and Pinterest.
7. Draft an email summarizing the information found about Brittany Spaniels.

LCIEE utilizes the plan to generate code to execute each operation or to expand one operation to generate a list of sub-operations to be performed. That is, LCIEE code generation is recursive where the sub-operations may be used to generate code or to generate a new list of sub-operations. This way, complex plans may be gradually broken down into simpler operations that can be performed by code.

Some of the operations require accessing the Internet, such as performing a search or posting an item on an online service. Other operations process data, and LLM's may be used to perform this processing, such as extracting details from found information, writing a poem, or drafting an email summarizing the information.

LCIEE checks the request in the prompt and determines if there are ambiguities in the request, such as lack of information to be able to perform the request. In this example, ambiguity field 206 has flagged that the email address for the email is missing. If the user clicks on the ambiguity field 206, another UI may be presented to enter the missing information. In other embodiments, the user may return to the UI 102 and redo the prompt by adding the missing information.

LCIEE also checks the tools that are needed to complete the plan. In this case, the access to the different online services has to be provided, as presented in tools field 208. The user may select each of the tools and provide credentials information to access the tool.

Regarding the second example, the plan generated by LCIEE is the following:

1. Go to a popular technology news website and find the most popular articles.
2. For each of the top articles, get the full content from the website.
3. Summarize each article into a short summary.
4. Extract the title, web address, and summary for each article.
5. Combine all the summaries into one long summary with each summary on its own line.
6. Use the tool that can generate coherent writing to combine all the individual summaries into one high-level overview.
7. Provide the high-level overview.

Figure 3:
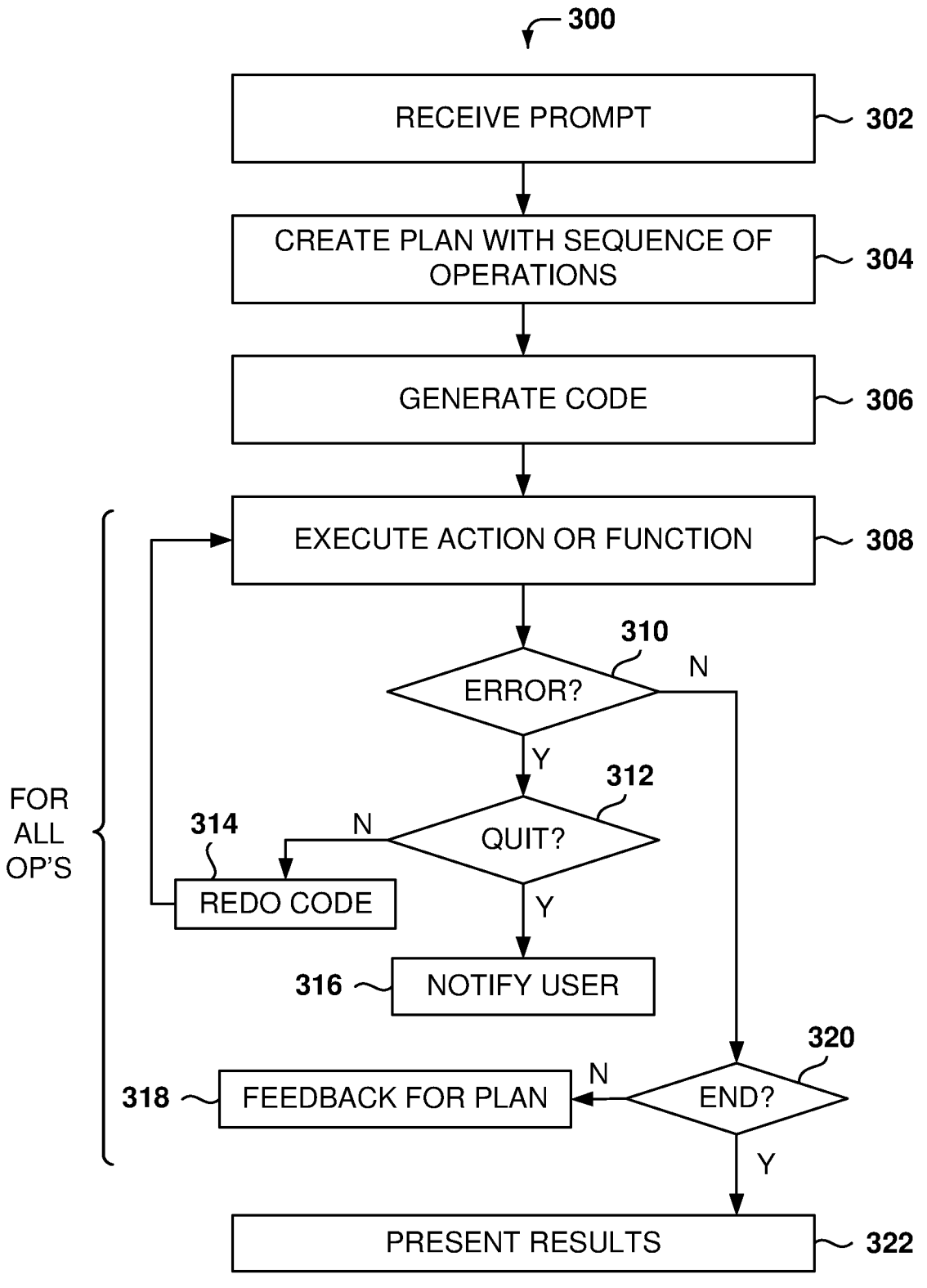
FIG. 3 is a flowchart of a method for generating a plan and executing the operations within the plan, according to some example embodiments.

FIG. 3 is a flowchart of a method 300 for generating a plan and executing the operations within the plan, according to some example embodiments. While the various operations in this flowchart are presented and described sequentially, one of ordinary skill will appreciate that some or all of the operations may be executed in a different order, be combined or omitted, or be executed in parallel.

At operation 302, the prompt is received via the UI, such as the UI 102 from FIG. 1. From operation 302, the method 300 flows to operation 304 to create the plan with the list of operations. In some example embodiments, the plan is generated using a Foundation Model (FM). The FM is an LLM on a vast quantity of data at scale (often by self-supervised learning or semi-supervised learning), such that it can be adapted to a wide range of downstream tasks. Some example FMs include Google's PaLM, Antrophic's Claude, and various early GPT foundation models, e.g., OpenAI's GPT-n series (e.g., GPT-4).

For example, the prompt used for ChatGPT may include a preamble provided by the system (e.g., "generate a plan for") followed by the user-entered prompt. More complex examples of LLM prompts are provided below with reference to FIG. 5 and others.

From operation 304, the method 300 flows to operation 306 to generate the code using the LLM. For example, the LLM prompt may be, "please create a Python program to performing the following plan," plus the plan previously created.

In other embodiments, operations 304 is optional, and the code is generated directly using an LLM based on the prompt entered by the user. Then, the operations in the plan are extracted from the code (e.g., the comments describing each of the first-level function calls).

Some embodiments are described with reference to the creation and execution of Python scripts, but the same principles may be used for other programming languages, such as JavaScript, Java, C++, etc. The embodiments presented should therefore not be interpreted to be exclusive or limiting, but rather illustrative.

From operation 306, the method flows to operation 308, performed for all the operations in the plan, to perform the operation by executing the corresponding code. It is noted that the embodiment described in FIG. 3 is for a plan that generates directly-executable operations, also referred to herein as atomic operations, which are operations that can be executed by a function call in the code. Other embodiments may include operations that have to be broken down into smaller suboperations, i.e., the operation acts like a mini-plan that needs to be expanded. The recursion of operations is described in more detail below with reference to FIG. 20.

However, running directly the code generated by the LLM may easily run into trouble. People using LLMs have found that LLMs may generate good code because there is a large corpus of code to train the LLMs, but that the code does not always run at the first try. There may be logical mistakes, calls to functions that do not exist in the libraries identified for the code, mismatch of arguments (e.g., passing an integer when a real number is required), access to private information, access to unauthorized servers, etc. This is why LCIEE provides a controlled environment to execute the code and manage execution errors.

It is noted that most users do not have access to the code that is being executed, unless the user has management privileges to run in debug mode and see the code when the execution is in progress.

The generated code is able to perform functions that may access an external resource, such as by using an API to access a server and get data from a database in the server or requesting a search from a search engine.

In some embodiments, LCIEE includes a Limited Python (LP) executer that is an interpreter for Python code but includes additional limitations, such as controlling how errors are handled or disallowing certain function calls (e.g., do not allow LCIEE to send an email for the user without an express request from the user). Thus, in some example embodiments, operation 308 is executed by the LP executer.

The LP executer analyzes each line of code, determines if the code is safe to execute and if access to a resource is required, determines if there is authorization to access the resource.

For example, in Python there is a function called eval( ), which is a versatile function that evaluates a string expression as a Python expression and returns the result. The LP executer removes the ability to call eval, which prevents unsafe expressions from being executed. This ability to precisely enable and disable certain function execution is further applied to actions that interact with user's applications. For example, the LP executer may provide access to read the user's email but may not provide access to send emails for the user.

If the LP executer finds an error during execution (operation 310), then the method flows to operation 312 to determine if the execution should quit or not. If there is no error, then the method 300 flows to operation 320.

When execution runs into an error, the LCIEE may decide to redo the code at operation 314 and then try to execute the operation again. This means asking the LLM to regenerate the code for that operation. For example, the prompt for the LLM includes information about the code being executed, the error generated, and the operation, and then request to generate new code to try again.

The process may repeat until the regenerated code is executed without errors or until a predefined number of iterations are performed. For example, the LP executer may decide to quit after trying to run the code three times, but other number of iterations may be utilized.

If LCIEE decides to quit at operation 312, the method 300 flows to operation 316 to terminate execution of the plan and notify the user.

At operation 320, a check is made to determine if this is the last operation to be executed. If this is not the last operation, operation 318 is executed to provide feedback with the results from this task for the plan, and then the next task is executed. If this was the last operation, at operation 322, the results are presented on the UI of the user.

Below is an example of the Python code generated for the example described above to summarize the news:

```
# Function to find and summarize top articles on news.ycombinator.com
def summarize_top_hacker_news_articles( ):
    # 1. Go to news.ycombinator.com and find the top articles
    hacker_news_url = "https://news.ycombinator.com"
    hacker_news_content = get_website_content(hacker_news_url)
    if not hacker_news_content.success:
        return 'Could not get contents of ' + hacker_news_url + '\n +
'Error:' + hacker_news_content.error_message
    # 2. Use data_extractor to extract the top article titles and URLs.
    top_articles = data_extactor("Extract top article titles and URLs.",
hacker_news_content.value. """({"title"; "...", "url": "... "})""")
    if not top_articles.success:
        return 'Could not extract top articles from ' + hacker_news_url +
'\n' + 'Error: ' + top_articles.error_message
    # 3. For each article, use get_website_content to get the full
content and use universal_writer to summarize each article.
    summaries = [ ]
    for article in top_articles.values:
        article_content = get_website_content(article["url"])
        if article_content.success:
            summary = universal_writer("summarize this article for a
general audience", article_content.value, "simple text string")
            if summary.success:
                summaries.append({"title": article("title"), "url":
article("url"), "summary": summary.value})
            else:
                summaries.append({"title": article("title"), "url":
article["url"], "summary": "Could not summarize this article."})
        else:
            summaries.append({"title": article["title"], "url":
article["url"], "summary": "Could not get article content."})
    # 4. Join the summaries into a single string with newlines.
    joined_summaries = "\n".join([f"{s['title']}
({s['url']})\n{s['summary']}\n" for s in summaries])
    # 5. Use universal_writer again to combine the summaries into a
high-level overview.
    overview = universal_writer("create a high-level overview of the top
articles on Hacker News", joined_summaries, "simple text string")
    if overview.success:
        return overview.value
    else:
        return 'Could not create a high-level overview of the top
articles on Hacker News. \n' + 'Error: ' + overview.error_message
output = summarize_top_hacker_news_articles( )
output
```

The code includes functions such as get_website_content( ) that accesses a website based on the URL provided as an argument, data_extractor( ) that extracts the top article titles and URLs, and universal_writer( ), which is described in more detail below with reference to FIG. 9.

Besides finding errors during execution, the execution of the plan may run into other problems, such as being unable to finish because the execution was derailed (e.g., an infinite loop). The LP executer includes other measures to avoid these problems, such as limiting the number of times a for loop is executed (e.g., quit execution after running the for loop ten times), or providing a maximum time of execution based on the complexity of the plan.

Another measure may include assigning an execution budget to the plan, such as the execution budget is decreased as the user executes code (e.g., function calls incur a cost against the budget). Once the budget is exhausted, the LP executer terminates or suspends execution of the plan.

Here is another example of the code generated for a prompt that requested "Analyze big tech companies and store information in a Google Sheet."

```
# Analyze big tech companies and store information in a Google Sheet.
def analyze_big_tech_companies( ):
    # Define a list of big tech companies to analyze.
    companies = ["Apple", "Microsoft", "Amazon", "Google",
"Facebook"]
    # Initialize a list to store the company information and news
summaries.
    company_data = [ ]
    # Iterate through each company in the list.
    for company in companies:
        # Obtain the company's stock ticker symbol.
        ticker_result = finance_get_ticker(company)
        if not ticker_result.success:
            continue
        ticker = ticker_result.value
        # Get the stock price and market cap.
        quote_result = finance_get_quote(ticker)
        if not quote_result.success:
            continue
        quote = quote_result.value
        # Get the latest news related to the company.
        news_result = finance_get_news_for_symbol(ticker)
        if not news_result.success:
            continue
        news_data = news_result.value
        # Find additional news articles if needed.
        additional_news_result = news_search (company)
        if additional_news_result.s1
            news_data.extend(additional_news_result.value)
        # Summarize the news articles.
        news_summaries = [ ]
        for news in news data:
            if news.url:
                content_result = get_website_content(news.url)
                if content_result.success:
                    summary_result = universal_writer("summarize this news
article", content_result.value, "simple text string")
                    if summary_result.success:
                        news_summaries.append((summary_result.value,
news.url))
        # Store the company information and news summaries.
        company_data.append((company, ticker, quote.regular_market_price,
quote.market_cap, news_summaries))
    # Create a new Google Sheet.
    sheet_result = google_file_create("Big Tech Companies Analysis",
"application/vnd.google-apps.spreadsheet")
    if not sheet_result.success:
        return "Error creating Google Sheet: " +
sheet_result.error_message
    sheet_id = sheet_result.value.id
    # Format the spreadsheet with appropriate headers.
    headers = ["Company Name", "Stock Ticker", "Stock Price", "Market
Cap", "News Summary", "News URL"]
    google_sheets_append(sheet_id, "Sheet1!A1", [headers])
    # Add the company information and summarized news to the
spreadsheet.
    for company_info in company_data:
        company, ticker, price, market_cap, news_summaries =
company_info for summary, url in news_summaries:
            row_data = [company, ticker, price, market_cap, summary, url]
            google_sheets_append(sheet_id, "Sheet1!A:A", [row_data])
    # Return the link to the created Google Sheet.
    return f"https://docs.google.com/spreadsheets/d/{sheet_id}/edit"
sheet_link = analyze_big_tech_companies( )
sheet_link
```

The result of this plan is a spreadsheet with information about tech companies Apple, Microsoft, Amazon, Google, and Facebook. The information includes items like the stock ticker, market cap, latest news, etc.

In some example embodiments, the LCIEE generates an internal or intermediate plan that is not shown to users. This internal plan is more tied to the code than to the plan presented to users. The internal plan is included in the LLM prompt to be processed by the LLM to generate a natural-language plan for the user.

For example, the following is an internal plan:

1. Use the 'general_search' function to search for information about Brittany Spaniels.
2. From the search results, use the 'get_web_content' function to extract the content of the most relevant websites.
3. Use the 'universal_writer' function to summarize the information obtained from the websites.
4. Use the 'universal_writer' function again, this time to write a haiku about Brittany Spaniels using the summarized information as context.
5. Use the 'general_search' function again, but this time search for images of Brittany Spaniels.
6. From the image search results, select and download the most suitable image.
7. Use the 'gmail_create_draft' function to draft an email. The subject of the email will be "Information about Brittany Spaniels", the body will contain the summary of the information found, the haiku, and the downloaded image.

Figure 4:
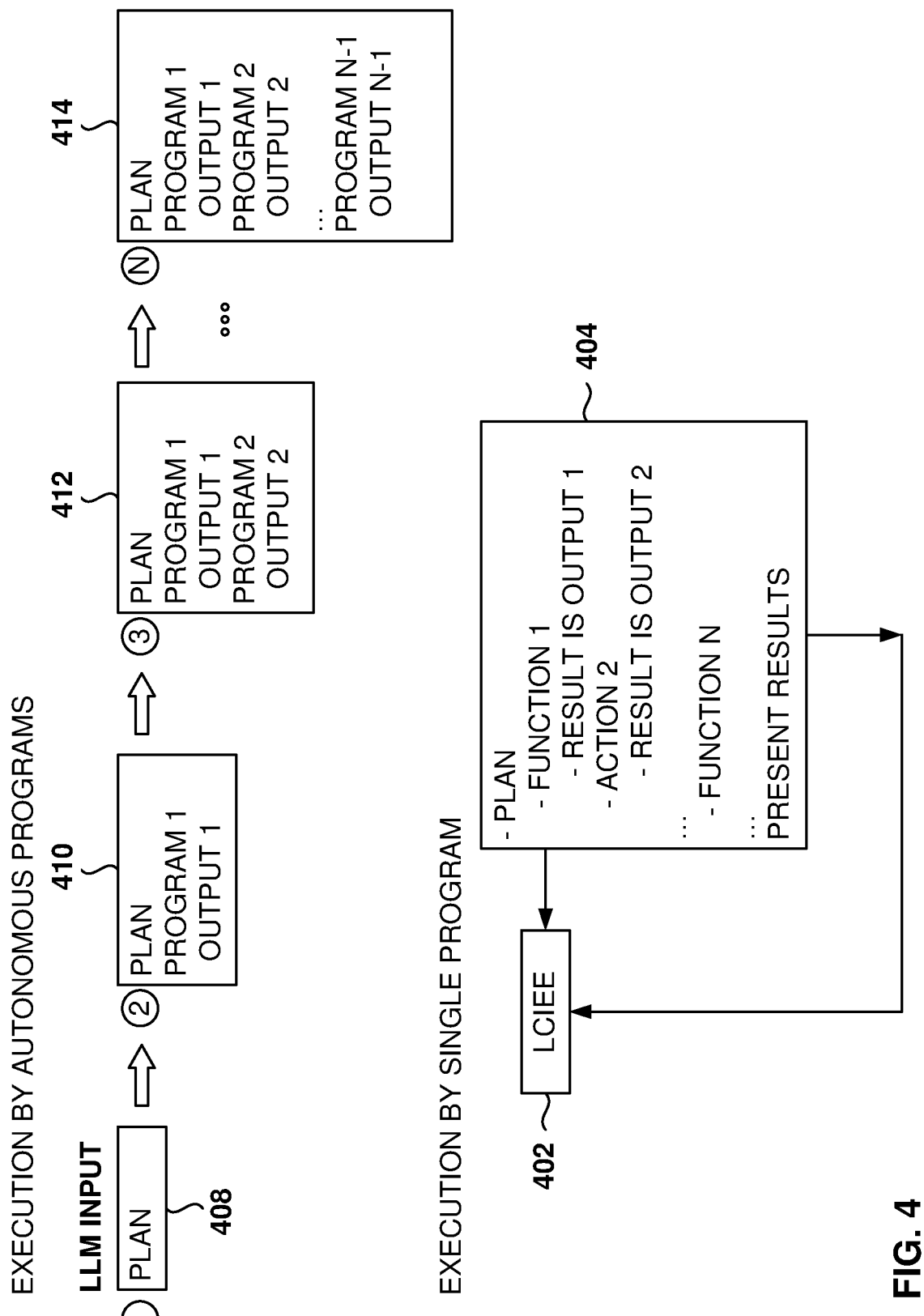
FIG. 4 illustrates the process for executing the operations of the plan, according to some example embodiments.

FIG. 4 illustrates the process for executing the operations of the plan, according to some example embodiments. In some prior art solutions, a plan 408 is executed in independents blocks of code, such that the entire history of the plan, execution, and outputs are repeatedly fed back to the LLM. For example, a first step 410 is to provide the plan, and execute a first program. Then, a second step 412 is executed, where the plan is provided, the output of program 1, and then a new block of code which is the program 2 that produces output 2. Each time a block is executed, the entire history is fed back to the LLM. This requires the LLM to be the execution engine that figures out relationships between the execution blocks. This quickly runs into context length limits with the LLM, and makes it challenging to maintain shared context (e.g., global variables, intermediate data obtained, etc.). It also quadratically increases the cost of execution since the entire history has to be continuously fed back to the LLM.

The process is then repeated for different blocks of code N times, where the n$^{th}$ step 414 requires to be fed the outputs from all the previous programs that have executed to understand the context. That is, the more programs are executed, the faster the complexity to execute the plan grows.

On the other hand, with LCIEE 402, a single program 404 is executed, so the program can define program variables to store data that may be used by the different function calls and action calls. This makes possible to have larger programs and reduce complexity.

Further, LCIEE allows the program to safely call actions that interact with other computers ("the outside world"). In prior art approaches, plugins are enabled (a plugin is a software component that adds a specific feature or functionality to an existing computer program). However, because other approaches only control the generation of code, but do not control the execution environment, it is very difficult to control the behavior of the program when executing plugins. On the other hand, LCIEE controls the execution environment, so even if a plugin misbehaves (i.e., does not work properly or executes malicious code), LCIEE will control what that the plugin does not execute forbidden instructions (e.g., root access, access to the OS data structures).

Figure 5:
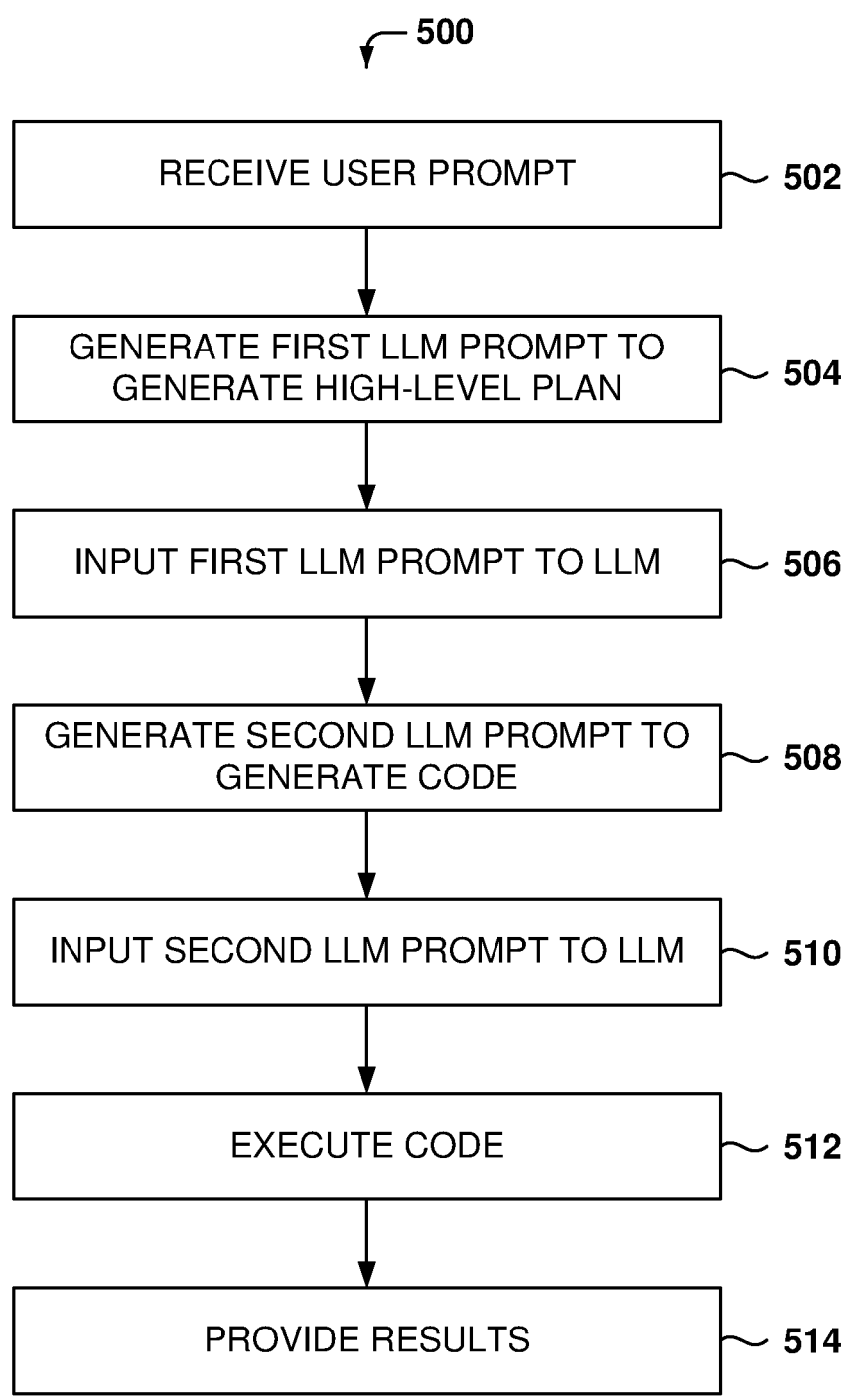
FIG. 5 is a flowchart of a method for generating and executing code for the plan, according to some example embodiments.

FIG. 5 is a flowchart of a method 500 for generating and executing code for the plan, according to some example embodiments. While the various operations in this flowchart are presented and described sequentially, one of ordinary skill will appreciate that some or all of the operations may be executed in a different order, be combined or omitted, or be executed in parallel.

Operation 502 is for receiving the user prompt, such as the one illustrated in FIG. 1. From operation 502, the method 500 flows to operation 504 to generate a first LLM prompt that will be input for the LLM to generate a high-level plan. The first LLM prompt includes instructions to the LLM for generating the high-level plan and information about the prompt received from the user.

In some example embodiments, the first LLM prompt includes fields that are filled in to complete the prompt. These fields include information based on multiple factors, such as the configuration for the user, the type of actions or external integrations needed, the final output format requested in the user prompt, etc. In the prompt examples presented herein, fields are presented as items enclosed within curly brackets ({ }). The curly brackets are not part of the final prompt and are shown as indicators or place holders for the data to be inserted.

Here is a sample first LLM prompt to create a high-level plan:

---

```
You are a detailed oriented person who likes to plan things. You
come up with comprehensive high-level plans that are easy to follow
and execute. They can involve loops and conditional statements.
You may reference the following dataclasses:
{DATACLASS_DEPENDENCIES}
You can use the following tools in your plans:
{ACTIONS_DESCRIPTIONS}
You have access to a coding environment that supports loops,
variables, conditionals.
Do not use any tools not mentioned above.
Assume that no documents exist until you create them.
The following libraries have already been imported, and are
available:
{EXTERNAL_LIBS}
Important:
- Plans should be a numbered list in markdown format.
- Refer to the tools in a high-level way.
After outputting the plan, put the names of the tools used, comma-
separated, in <Tools> and </Tools> tags. Be comprehensive in
listing which tools were used, even if the high-level plan does not
mention them explicitly by name.
Example
===
Create a function that given a url, will:
1. First do a general_search to find relevant information from the
web.
2. Then, extract all the urls from the search results.
3. Because the content on each site may have further links, we want
to crawl them to find more urls and content.
   - Create another function to recursively to crawl the urls and
extract the content.
   - Make sure the crawling is limited to a reasonable depth.
   - Use data_extractor to extract urls from website contents.
   - Use universal_writer to summarize the content of each site,
with attributions to the urls.
   - Use map_urls to map the short urls to full urls.
5. Save the summary to a document.
7. Return summary as the output.
8. Do the work with 'xet data founders' as the query.
Call the function 'xet data founders' as the query.
<Tools>general_search, map_urls, data_extractor,
universal_writer</Tools>
<Call>crawl_and_summarize('xet data founders')</Call>
Please help create a thoughtful concise high-level plan for
achieving this:
{USER_PROMPT}
```

---

For example, if the request involves accessing or creating a Google Sheets document, then the libraries will be added that support operations for Google Sheets. However, if the prompt is associated with a search for patent information (e.g., list prior art cited in prosecution of a certain patent application), then libraries for accessing patent resources will be included.

From operation 504, the method 500 flows to operation 506 where the first LLM prompt is fed as input to the LLM model, and the LLM model will return the high-level plan.

From operation 506, the method 500 flows to operation 508 to generate a second LLM prompt to generate the code that will be executed to implement the plan. The second LLM prompt utilizes the high-level plan plus additional information and fields. As with the first LLM prompt, the second LLM prompt utilizes fields based on the request and what the plan is aiming to achieve.

Here is an example of the second LLM prompt:

---

```
You are a creative, straight-forward and direct principal software
engineer.
You like to write code, and do not like to chat.
You have access to a restricted Python interpreter.
You can use loops, variables, conditionals, and basic python.
Do not make any assumptions about the format of strings returned
by functions, unless otherwise stated.
You may reference the following dataclasses, but do not construct
them directly:
{DATACLASS_DEPENDENCIES}
The following libraries have already been imported, and are
available:
{EXTERNAL_LIBS}
You *CANNOT* import any other libraries, and are only limited to
the following functions:
{ACTION_DOC_STRINGS}
Also, these functions are available: {BASE_OPS}
You MUST produce comments along side the code so that a non-
programmer can understand it extremely well. For each line of code,
you must add a comment above it to express in a super simple way
the intent of the code at that line.
Each comment MUST be on one line.
Requirements:
- The output must have both a <Python> section and a <Call>
section.
- Only functions go in <Python></Python> tags.
- The script to call the function with the task-specific arguments
must go in <Call></Call> tags.
- DISALLOWED: eval( ), exec( ), nonlocal, or global. You MUST
NEVER use them.
- Never import any libraries, assume all available libraries have
already been imported.
- Never create any dataclass or classes.
- Handle errors by throwing exceptions. Use the most appropriate
exception type depending on the error.
- You can only use pydantic.create_model to create models.
- You MUST define all your pydantic models at the TOP of the
<Python> section.
- You MUST use annotated assignments.
Tips:
- Try to write general functions instead of task-specific
functions.
- The arguments to the function in <Call></Call> can be specific to
the task.
- Include specifics of the goal in the context to universal writer
verbatim. Be verbose.
- Provide universal writer with more details in the task and
context.
- If tools document that they throw exceptions, try to handle them
gracefully while still accomplishing the task. If an exception
would prevent the task from being accomplished, then throw the
exception. You may add additional context when throwing it.
Here is the high-level plan:
{HIGH-LEVEL PLAN}
```

---

From operation 508, the method 500 flows to operation 510 where the second LLM prompt is input for the LLM, which returns the code to be executed for the plan.

From operation 510, the method 500 flows to operation 512 where the code generated is executed by the LP executer (although some validations on the code may be performed before execution). At operation 514, the results are presented on a UI.

FIG. 6 is a UI 602 showing the operations that are being executed, according to some example embodiments. In some example embodiments, the operations are extracted from the comments of the code.

In the illustrated example, the operations include the following:

Do a general_search for "Brittany Spaniels information" and extract relevant details.

Use universal_writer to write a haiku about Brittany Spaniels based on the details.

Post the haiku to Twitter and Facebook.

Do an image search for "Brittany Spaniel" and download an image.

Post the image to Snapchat, Instagram, TikTok and Pinterest.

Use universal_writer to draft an email with a summary of the information found.

Therefore, the user can see the progress being made during execution. If there is an error during the execution of the code, the error is presented in the UI 602, with a selectable option to open another UI with more details on the error and the progress.

FIG. 7 is a UI 702 showing the results after executing the plan, according to some example embodiments. The UI 702 shows the initial plan 704 and the results 706. The results 706 for this example include the following:

Post to Twitter: Brittany Spaniel is a hunting dog breed that is energetic and intelligent. They have floppy ears and a wagging tail, and they love to roam and bark. However, with early training and exercise, they can become the perfect family friend.

Post to Facebook: Brittany Spaniel is a hunting the breed that is energetic and intelligent. They have floppy ears and a wagging tail, and they love to roam and bark. However, with early training and exercise, they can become the perfect family friend.

Post image to Snapchat

Post image to Instagram

Post image to TikTok

Post image to Pinterest

Send email: Dear [Recipient],

I hope this email finds you well. I wanted to share some information with you about Brittany Spaniels, a breed of dog that I recently researched.

. . .

Brittany Spaniels where originally bred in France for hunting purposes. They are medium-sized dogs with a muscular build and a distinctive orange and white coat. They are known for their high energy levels and of exercise, making them a great choice for active families.

In terms of temperament, Brittany Spaniels are friendly and affectionate dogs that love to be around people. They are also highly intelligent and trainable, making them a good choice for first-time the owners.

When it comes to care requirements, Brittany Spaniels need regular exercise and mental stimulation to keep them happy and healthy. They also require regular grooming to keep their coat in good condition.

Overall, Brittany Spaniels make great pets for families who are looking for an active and affectionate companion. If you have any further questions about this breed, please don't hesitate to ask.

Best regards, [Your Name]

Thus, the results indicate performing the post to Twitter, the post to Facebook, the image posted to Snapchat, the posted image to Instagram, the posted image to TikTok, the posted image to Pinterest, and the email that was sent.

Figure 8:
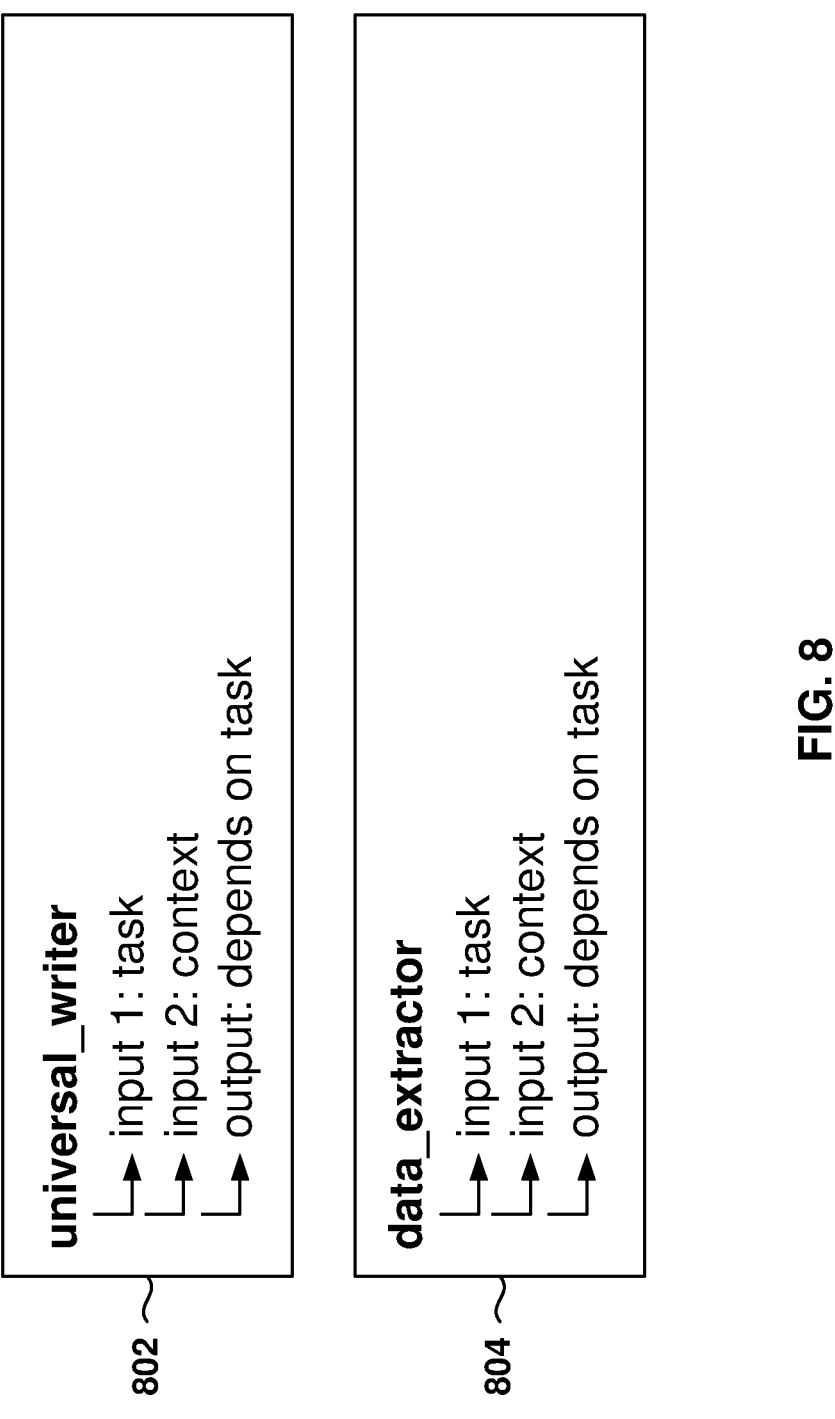
FIG. 8 illustrates two versatile system-provided functions, according to some example embodiments.

FIG. 8 illustrates two versatile system-provided functions, according to some example embodiments. The two functions are universal_writer 802 and data_extractor 804.

The purpose of the function universal_writer is to perform any writing task by leveraging the power of LLMs. For example, when asked to produce a summary of "latest trends in AI," one of the operations may be to "find a website covering the latest trends," and then to "summarize it." These operations may be autogenerated by the LLM. Other tasks may include "extract URLs," "translate to English," etc.; virtually any task related to the content could be included.

The inputs for the universal_writer are a task to be performed (text format) and a context that defines the problem area. For example, the context may be a document, a website, a theme (e.g., "patents," "news," "dating," etc). The output will depend on the requested task, e.g., a text summary, a list of items.

It is interesting to note that the task to be used as input is generated automatically using the LLM, not a human. The LLM figures out what is the right task to be performed and uses that as the input for the universal_writer.

Further, inside the universal_writer, there may be the creation of an LLM prompt to generate code to perform the task requested. Additionally, the LLM prompt used to create the universal_writer may vary based on the operations of the plan. LCIEE will select the proper LLM prompt to be used to create the universal_writer.

Here is an example of an LLM prompt used to generate the universal_writer function. This is an ingenious design to improve instructions. As before, fields in the LLM prompt example are enclosed in curved brackets, and the fields are filled in based on the request.

```
You are a creative, straight-forward and direct instruction master.
You like to just get to the point and get the job done. The model
is able to take an instruction and then return a response.
Using this ability, you MUST help your team write the best
instruction for an LLM such as GPT3. You MUST be concise, clear and
specific.
NEVER suggest using any tools.
NEVER come up with any names, facts, or information unless
provided.
NEVER produce any placeholders.
You NEVER ask questions, or follow ups.
Assume the task is referencing context that you will be provided
separately.
You MUST return a better prompt between <BetterInstruction> and
</BetterInstruction> tags.
Original Instruction:
===
{TASK}
===
```

Here is another example of an LLM prompt used to generate the universal_writer function to perform a writing task.

```
You are a direct and straight-forward, and direct AI assistant.
You do not ask questions, or follow ups. You just return your best
attempt at the task.
```

-continued

```
Assume it's for something general, unless given more information.
Provide a direct answer without additional commentary.
Put your response between <UniversalWriter> and </UniversalWriter>
tags.
If you cannot accomplish the task, respond in the <Concerns> and
</Concerns> tags.
If you are sorry that you cannot do it, respond in the <Concerns>
and </Concerns> tags.
If the information you need does not exist, respond in the
<Concerns> and </Concerns> tags.
Always provide your best response.
Document
===
{CONTEXT}
===
Task
===
{TASK_IMPROVED_VERSION}
===
You MUST respond with <UniversalWriter> and </UniversalWriter>
tags.
```

The data_extractor function is used to extract data from any given source. For example, extract inventor names from a patent (given the patent number, which is the context), extract the claims from a patent, extract the products on sale from a website, extract today's appointment from a calendar, etc.

As with universal_writer, the inputs are the task and the context; the output is the extracted information. The format of the output will depend on the task requested (e.g., "generate a markdown table with stock prices" will produce a markdown table). Also, the data_extractor function may generate its own LLM prompt.

Here is an example of an LLM prompt used to generate the data_extractor to use an LLM to copy segments of text that are relevant to the task.

```
Copy any information related to: {DATA_KEYS}
Document
===
{CONTEXT}
===
From the document above, I want snippets that will help me with:
{EXTRACTION_TASK}
===
Please COPY ALL information that is relevant.
You MUST INCLUDE supporting content that shows the context.
```

A second LLM prompt example for universal_writer is to extract data from identified segments and put the output into a structured format. This second example is more complex than the first one, so a cheaper LLM may be used in the first example, while a more expensive (in terms of computing resources required) for the second example. Here is the LLM prompt for the second example:

```
You are a data extraction expert.
You MUST only use information from provided sources.
Document
===
{CONTEXT}
===
{EXTRACTION_TASK}
===
Extract data from the source document, calling save_data with the
results in ResultUnion.
Required fields: {REQUIRED_FIELDS}
Optional fields: {OPTIONAL_FIELDS}
===
Please call save_data with the data you extracted.
Try your BEST to extract the data, skip optional fields as needed.
If the data is not in the source document, please call save_data
with failure_reason.
================================================================
Note: Prompt 2 is called with the latest "function_call" schema
that OpenAI provides:
    class Failure(pydantic.BaseModel):
        failure_reason: str
    class DesiredData(pydantic.BaseModel):
        {DATA_SCHEMA}
    openai.ChatCompletion.acreate(
        ...
    function_schema={
        "name": "save_data",
        "description": "Save extracted data",
        "parameters": {
            "title": "ResultUnion",
            "type": "object",
            "properties": {
                "result_union": {
                    "title": "Result Union",
                    "oneOf": [DesiredData.schema( ),
Failure.schema( )],
                }
            },
            "required": ["result_union"],
        },
    },
    ...)
```

As the code is running, the code is using universal_writer 802 and data_extractor 804 to write and extract data independently. It is figuring out how to use itself inside a program, akin to an inception-like scenario. What is interesting to note is that these functions provide the code with a set of tools for the code to use.

The LLM prompt creation has several unique features, such as prompting using multiple-inputs and multiple-outputs. In some example embodiments, the LLM prompts use XML-based tags to indicate the different types of inputs and outputs, such as:

Inputs:
    <task>please summarize this</task>
    <content>this is a long document</content>
Outputs:
    <summary>this is a summary</summary>
    <concerns>these are any concerns that came up while processing the summary</concerns>
    <success>true</success>

Furthermore, tags can be randomized to prevent prompt injection attacks that might guess at what tags are used, or if an input/output would happen to also contain the corresponding tag.

Figure 9:
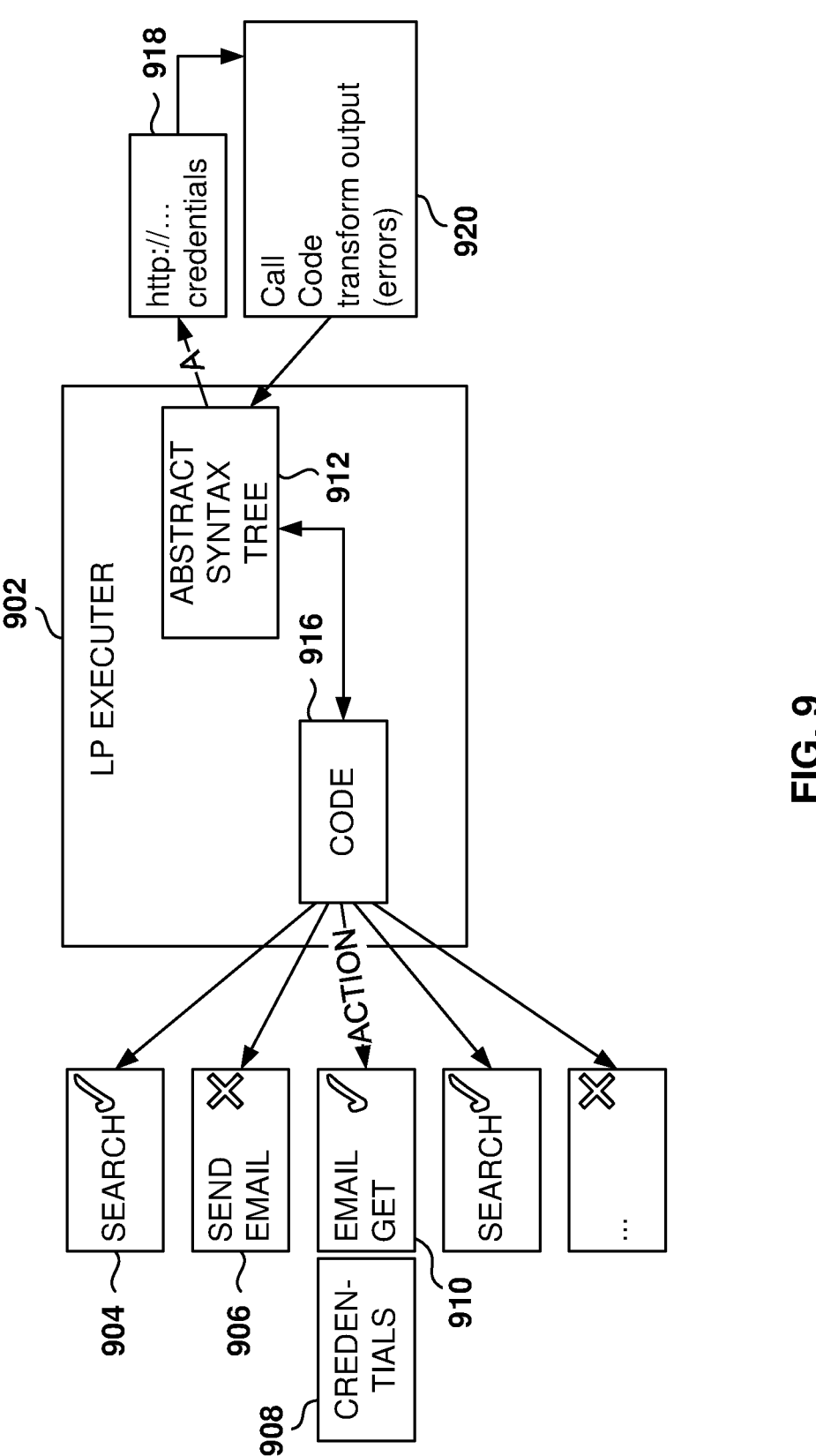
FIG. 9 illustrates the execution of actions by the Limited Python (LP) Executer that is part of the Large Language Model (LLM) Code Interpreter and Execution Environment (LCIEE), according to some example embodiments.

FIG. 9 illustrates the execution of actions by the LP executer 902 that is part of the LCIEE, according to some example embodiments. LLMs can generate code 916, but there is still a need for a programmer or developer to execute the code and operate the environment (e.g., open up a terminal window, run pip, run npm, etc.). The LP executer 902 provides an execution environment for LLM-generated code, where the LP executer 902 closely controls execution for safety and reliability, and automatically self-heals for erroneous code generated by the LLM.

In some example embodiments, the is a custom code interpreter (e.g., python interpreter) for the LLM code to run in. The execution environment is customized to safely make calls to external APIs, have fine-grained control over the code execution state, and analyze the code statically, while fully leveraging the outputs and errors.

The benefits of this approach include being able to statically analyze how input/output sources are connected. Further, by controlling the code interpretation, it is possible to dynamically prevent infinite loops, prevent leakage of API secrets, allow debug/resume/breakpoints, automatically parallelize execution to allow faster iteration, let users do bigger tasks (e.g., handle large batches of data, etc.), and automatically report progress to users to improve the user interface and allow faster iteration.

This approach enables LCIEE to leverage best practices from software engineering to be used in an LLM-created code environment, which includes the following abilities:

Support triggers and events as first-class citizens;
    cache code output and reuse the code in future applications;
    enable code to be rewritten part-way through execution;
    use the LLM to interpret user feedback in context of an existing program, update the code to fix problems, and update ongoing execution/results; and support the idea of "exec natural," where the LLM can decide that halfway through a program, it does not know what code should execute yet, so it defers execution by telling itself to write the code later based on the context at a future time.

This approach provides an elegant solution to challenges in the planning, memory, composability space that is common in AI research, and the LP executer 902 enables these features through software engineering concepts, e.g., memory is simply local variables, composability is functions, planning is the script/code, etc.

Further, LCIEE provides effective code generation using a high-level planner. By separating the planning and the code generation, the result is more reliable and better code. As discussed above, the high-level plan is created first, which may include high level references to function names and their purposes, and then the code is generated from the high-level plan.

The LP executer 902 is responsible for interpreting and executing the LLM-generated code and provides fine-grained control over the execution state, enabling safety measures such as preventing infinite loops, leakage of API secrets, and allowing debugging features like breakpoints and resume points.

The LP executer 902 obtains the code 916 and determines an Abstract Syntax Tree (AST 912) for every line and part of the code 916. The AST 912 is a tree representation of the abstract syntactic structure of source code written in a programming language. Each node of the tree denotes a construct occurring in the source code, and the syntax is "abstract" in not representing every detail appearing in the real syntax, but rather just the structural or content-related details. ASTs are used in the analysis of source code and are used in the process of program compilation, where they are used to build the structure of the program, helping to understand the syntax of the new language and a step in the translation process to convert high-level language instructions into machine code.

For example, an if statement would have a left branch and a right branch, and the AST 912 will have a left and right branch in the tree representation. The LP executer 902 then proceeds to walk through the code 916, executing it in a detailed manner at every token level input.

In the illustrated example, at some point, the LP executer 902 reaches an action email get 910 that access an email server to retrieve email for the user. To get the email, the credentials 908 of the user are needed. Other possible actions may include a search action 904 to perform a search, a send-email action 906 to send email, a server-request action 918, etc.

The user can choose which actions they want to enable for the LP executer 902 to access. For instance, they may choose to enable email get and search, but not sending emails because it may be too risky.

The LP executer 902, for the actions enabled by the user, is informed during the code generation process about the actions it has access to, but the LP executer 902 is not informed about the actions it does not have access to. Consequently, the generated code 916 is not even aware of the actions it does not have access to.

While the LP executer 902 is running, if an attempt is made to execute an action that is not enabled, the call for that action is simply extracted from the code and not executed.

The credentials 908, (e.g., passwords, API keys, and other similar elements) are not involved in the code generation, and the credentials 908 are handled in another part of the system separate from the code generation.

Users may wish to integrate the actions they use into the LCIEE. One method would be to write it into the existing code base, but this is not ideal. Instead, a new action is divided into two parts: the API call and the processing of the results from the API. In the illustrated example, the server-request action 918 is divided into the actual API call and the processing 920.

The API call could involve calling another website or distributed entity with certain credentials. This can be configured to be very generic, as calling a website is a common action. This part is made available so that anyone can enable it. However, the challenge arises after obtaining the results from that API call. Often, these results need to be manipulated or reformatted in a way that makes sense or that is easier to process. Typically, after calling the API, there is some code that transforms the outputs into a more usable form, and it might also be necessary to capture errors. Therefore, the processing 920 includes code that transforms the output. The API call is generic and well defined and understood, but the processing 920 tends to be very specific depending on the type of request.

The LP executer 902 allows users to add code to the environment, without restrictions, and the code can then be executed within the LP executer 902 in a safe environment. Further, the LP executer 902 may also generate this code and be saved for later reuse.

In some example embodiments, a user may provide the documentation for accessing a resource via an API, and then requests LCIEE to create the code to access this resource based on the documentation. All the user needs to do is to add credentials 908, if needed, separately.

Figure 10:
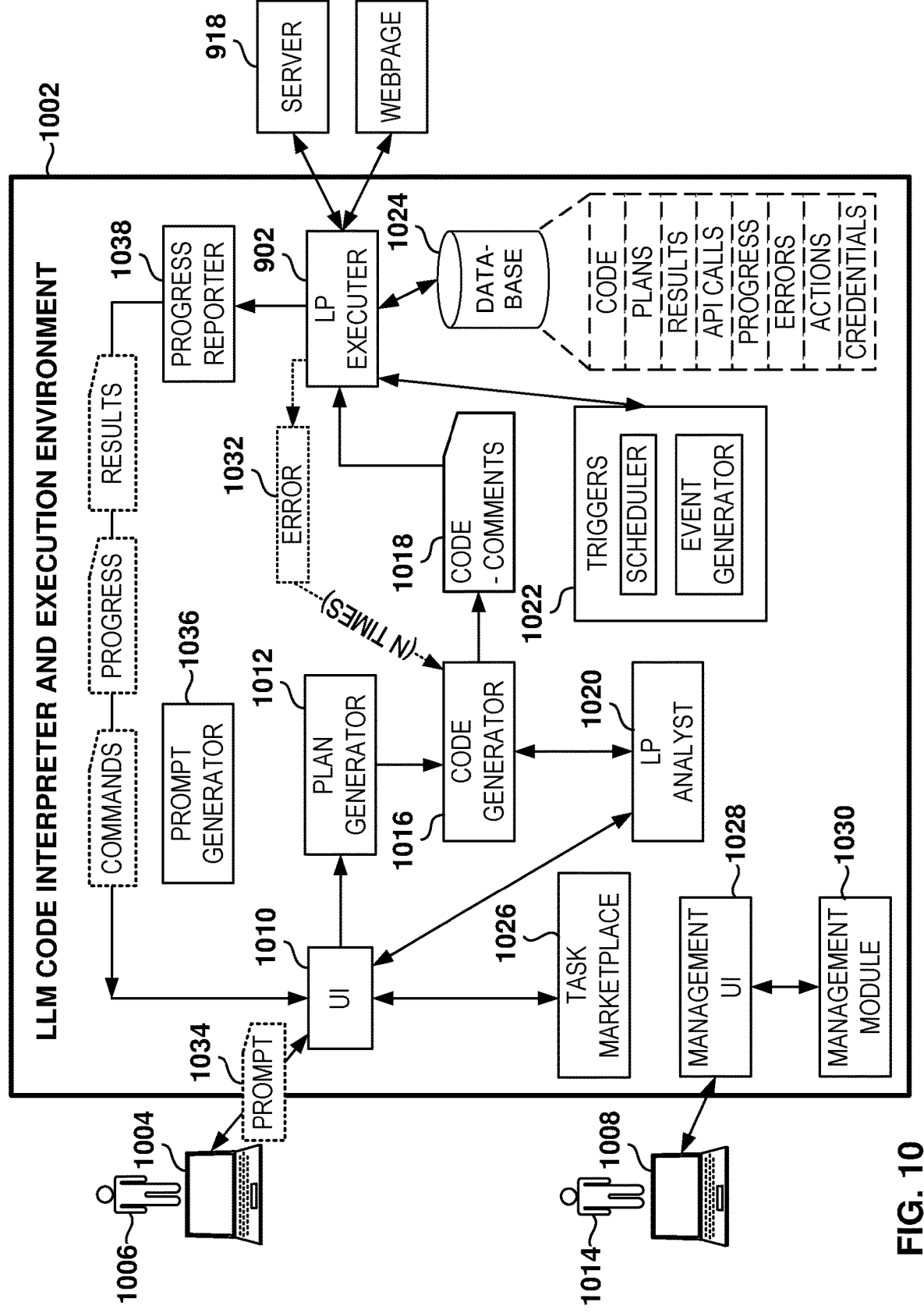
FIG. 10 is a sample architecture for the LCIEE, according to some example embodiments.

FIG. 10 is a sample architecture for the LCIEE 1002, according to some example embodiments. The LCIEE 1002 combines several key concepts from the fields of artificial intelligence, software development, and information security, including, but not limited to, static code analysis, dynamic execution control, auto-healing, parallel execution, and user feedback interpretation. These features are bundled into a cohesive product that aims to enhance LLM's usability, versatility, and safety in coding applications, thus bringing the principles of software engineering into the realm of AI and LLMs.

In some example embodiments, the LCIEE 1002 includes the following components: the LP executer 902, a plan generator 1012, a code generator 1016, an LP analyst 1020, a prompt generator 1036, a progress reporter 1038, a database 1024, a user UI 1010, a management module 1030, a management UI 1028, and a task marketplace 1026. In other embodiments, the LCIEE 1002 may include additional components, fewer components, combine components, or break components into multiple elements.

The LP executer 902 is responsible for controlling the overall execution flow, allowing dynamic interventions like code rewrites part-way through execution and interpreting user feedback to adjust execution and results. In some example embodiments, the LP executer 902 includes an execution parallelizer component that works to parallelize code execution, enabling the LCIEE to handle larger tasks and improve execution speed.

The plan generator 1012 produces the detailed high-level plan from the user prompt, and the high-level plan is then used by the code generator 1016 to produce the code. The code generator 1016 passes the code 1018 to the LP executer 902.

Here is an example of code generated by the code generator 1016 for a request to analyze big tech companies and store the information in a Google Sheet.

```
# Analyze big tech companies and store information in a Google
Sheet.
def analyze_big_tech_companies( ):
    # Define a list of big tech companies to analyze.
    companies = ["Apple", "Microsoft", "Amazon", "Google",
"Facebook"]
    # Initialize a list to store the company information and news
summaries.
    company_data = [ ]
    # Iterate through each company in the list.
    for company in companies:
        # Obtain the company's stock ticker symbol.
        ticker_result = finance_get_ticker(company)
        if not ticker_result.success:
            continue
...
```

The LP executer 902 will check if the code 1018 includes comments, and these comments may be used as descriptors of the functions or actions being executed. Because the comments are usually high-level descriptions that regular users can understand, the LP executer 902 brings the comments to the UI 1010 via the progress reporter 1038 (see for example the UI 602 in FIG. 6). The UI 1010 is presented on a user device 1004 associated with user 1006. For example, the prompt 1034 is provided by the user 1006 on the UI 1010.

Further, if an error 1032 occurs during execution, the LP executer 902 sends the error back to the code generator 1016, which examines the error 1032 and attempts to generate improved code 1018 for the LP executer 902 to try again for that particular function or action. The process may be repeated several times (e.g., up to three times or more) before the LP executer 902 stops trying and reports the error to the UI 1010.

The user and the LCIEE may also create triggers 1022, which may be scheduled (e.g., give me a summary of the news every morning at 7 AM) or that are generated based on events (e.g., wake up the system analyst when there is a computer crash). Each trigger will cause the execution of a task, a function, or an action by the LP executer 902.

The LP analyst 1020 scans the LLM-generated code to understand how input/output sources are connected, aiding in the optimization of the code and its execution. The information is used to inform the user about the actions the system might take, such as accessing their emails. Thus, the LP analyst 1020 functions between the code generator 1016 and the LP executer 902. For example, the LP analyst 1020 generated the ambiguity field 206 and the tools field 208 shown in FIG. 2.

The prompt generator 1036 generates the LLM prompts used by the code generator 1016 to feed as inputs for the LLM. There could be multiple types of prompts being generated, and in some example embodiments, a plurality of prompt generators may be available, each with a distinctive goal to generate LLM prompts for a specific purpose.

The progress reporter 1038 tracks and reports progress and partial results to the user to improve the user experience and allow faster iterations. The progress reporter 1038 prepares information provided by the LP executer 902 for the user, such as progress reports, results of the execution of the plan, and commands being executed.

The database 1024 may include a single database or a distributed database system to store different parts of the stored data. The database 1024 stores code, plans, results, API calls executed, progress reports, errors, actions, credentials, and other LCIEE-related data. The database 1024 may be accessed by the different components of the LCIEE 1002.

The user UI 1010 is used for interfacing with the user, such as the UIs in FIGS. 1-2, and others. The UI 1010 may also describe what tools are available to the user, and possibly which tools are available if the user obtained authorization to access them.

The management module 1030 is used for configuring management options, such as adding users, providing access to users, enabling functions for the LP executer 902, configuring which tasks can be used by which users, etc. The management module 1030 interacts with an administrator device 1008, associate with administrator 1014, via the management UI 1028.

Once a plan is created and properly executed, the LCIEE provides an option to save the plan to make it reusable for the future. As discussed above, the saved plan is referred to as a task, and these tasks are saved in the task marketplace 1026, so the user, and other users, may invoke them in the future. This operation is referred to as the "Export and Save" function. More details about the use of the task marketplace 1026 are provided below with reference to FIG. 14.

Figure 11:
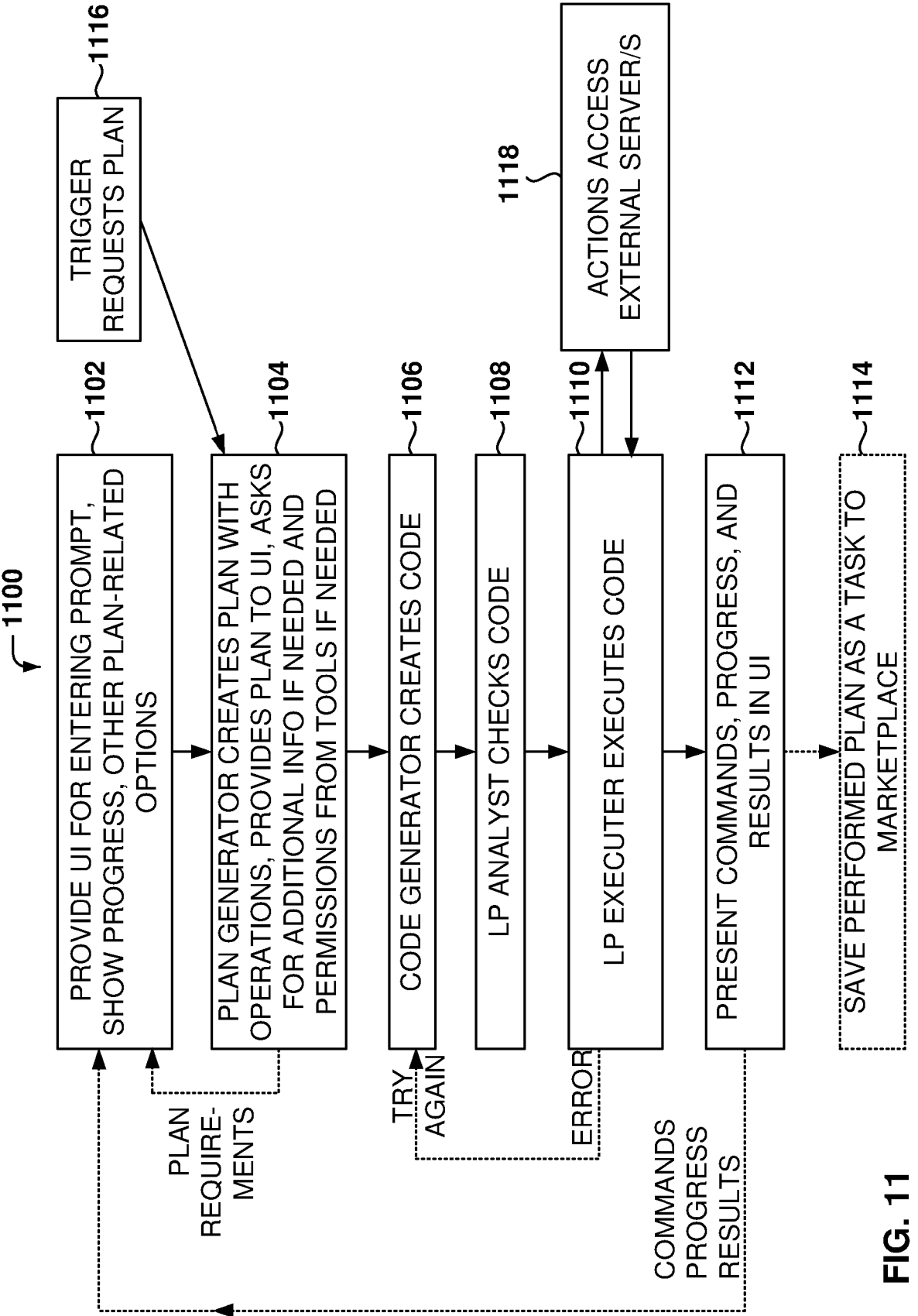
FIG. 11 is a flowchart of a method for processing a request by the LCIEE, according to some example embodiments.

FIG. 11 is a flowchart of a method 1100 for processing a request by the LCIEE, according to some example embodiments. While the various operations in this flowchart are presented and described sequentially, one of ordinary skill will appreciate that some or all of the operations may be executed in a different order, be combined or omitted, or be executed in parallel.

Operation 1102 is for providing a UI for entering the user prompt, showing progress, and other plan-related options. Additionally, a trigger may request that a plan or task is executed at operation 1116.

From operation 1102, the method 1100 flows to operation 1104 to create, by the plan generator, a plan with operations, and present the plan in the UI to the user, which allows the user to provide additional information if needed to complete the plan and permissions to access certain tools if needed.

From operation 1104, the method 1100 flows to operation 1106 to create the code by the code generator. The code generator may invoke the LLM one or more times to generate code.

From operation 1106, the method 1100 flows to operation 1108 to check the code by the LP analyst.

From operation 1108, the method 1100 flows to operation 1110 execute the code by the LP executer. If the LP executer runs into an error during the execution of the code, the code generator will retry to generate new code to try execution again, up to a number of times until the LP executer quits.

The LP executer 902 may perform actions (operation 1118) to access external servers.

From operation 1110, the method 1100 flows to operation 1112 to present commands, progress, and results in the UI.

Optionally, the completed plan may be saved as a task in the task marketplace at operation 1114.

Figure 12:
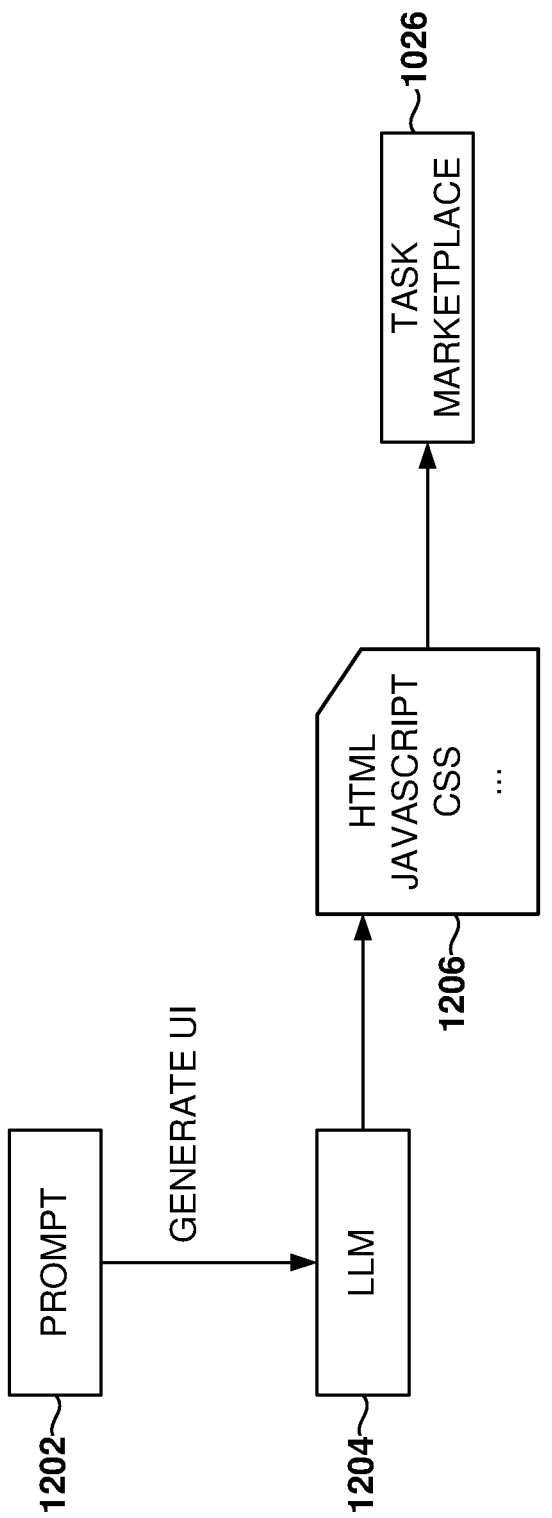
FIG. 12 illustrates the generation of a UI utilizing LCIEE, according to some example embodiments.

FIG. 12 illustrates the generation of a UI utilizing LCIEE, according to some example embodiments. It has been observed that with a recent version of ChatGPT, if a description of the user interface is provided, ChatGPT can generate a user interface in code.

Given a scenario where a textual description of the desired user interface is provided (e.g., provide a UI with this title, this message, and two input fields named user_name and password), the LLM can generate the corresponding code, e.g., a website, complete with HTML, JavaScript, and CSS. However, there are certain issues involved, such as how is the code integrated into the system and in what website is the UI implemented.

LCIEE provides a way to enter a request to implement an UI, via the prompt 1202, to allow the user to provide a high-level description of the user interface, and then generate the code 1206 using the LLM 1204. Further, LCIEE creates the connections that link the UI into the APIs available for access. This results in aesthetically pleasing and functional interfaces.

The UI needs to be executed, and this execution may occur in the LCIEE. The code can be generated, stored, and served, by the LCIEE. That is, LCIEE takes the user interface request and generates the entire backend to supports the UI. This is referred to as the backend LCIEE. Further, LCIEE can also provide data storage for the user.

The created UI may interface directly into a user's own database that may exist outside the LCIEE. The connection may be established through a plan or through a task that has been saved in the task marketplace, where the task is linked back to an external API provided by the user. The task exposes the API, and there is an action in the user interface that calls for the task to be executed.

For instance, if a UI is designed to search the US Patent Office database, the user can request a user interface with various fields. When the search is conducted for a specific client, the UI would cause LCIEE to access the database and execute the search.

Figure 13:
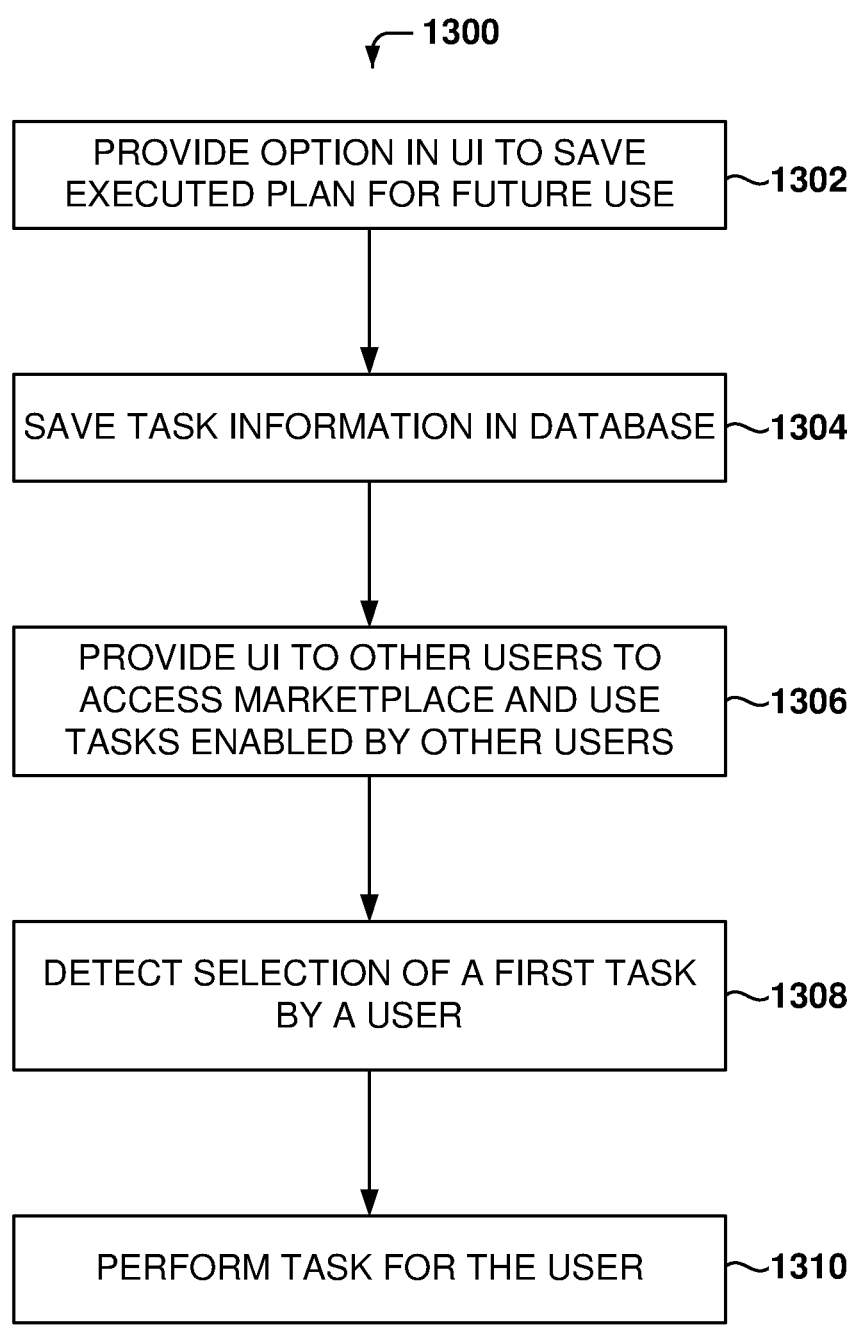
FIG. 13 is a flowchart of a method for utilizing the task marketplace, according to some example embodiments.

FIG. 13 is a flowchart of a method 1300 for utilizing the task marketplace, according to some example embodiments. Some plans are repeatable, that is, after being executed one time properly, the plan could be performed again in the future. For instance, a search that locates products with features similar to a given patent (e.g., to search for potential infringers).

It would be nice not having to start a plan from scratch and reuse the code that has already been successfully executed. Further, some aspects of the plan may vary from plan to plan (e.g., the patent number), while everything is the same. In this case, LCIEE provides a feature to name variables to be embedded in the plan when it is saved as a task. What varies in the code of the task is the argument, which is the patent number that is passed to execute the search.

LCIEE enables plans to be reusable when saved as tasks, and these tasks can have inputs and outputs. Users can ensure plans work, save the executed plans as tasks, and then share these tasks with colleagues. The colleagues can then modify the inputs to suit their needs.

Further, when a plan uses one or more of the saved tasks, the new plan may be itself converted into a new task. This way, the user can continue to increase functionality based on the building blocks, i.e., the tasks, previously created. For example, a task is created for creating a mobile app, and another task was created to access health records. The tasks can then easily be combined to create a mobile app that accesses health records.

Additionally, LCIEE provides some system-created tasks that can be used by other users, such as the previously described universal_writer and data_extractor.

The significant advantage of LCIEE is its potential to automate repetitive tasks. Many individuals have jobs that involve repetitive tasks. The aim is to examine these processes and identify areas where efficiency can be improved, and the goal is not necessarily to replicate the exact process, but to automate tasks that consume a significant amount of time. By spending a few hours setting up this automation, individuals can reclaim those hours for other tasks.

For instance, a user could create a system where dropping a document into a specific OneDrive folder triggers an email to be sent after 20 minutes. The question then becomes whether one can optimize their life significantly using these automated processes. Further, as the system evolves and grow, it becomes more efficient and supports increasing functionality.

Returning now to the method 1300, operation 1302 is for providing an option in the UI to save an executed plan, as a task, for future use.

From operation 1302, the method 1300 flows to operation 1304 where the task information is saved in the database.

From operation 1304, the method 1300 flows to operation 1306, where an option is provided in the UI to allow the user to access the task marketplace and use tasks of the user and tasks enabled by other users.

From operation 1306, the method 1300 flows to operation 1308 where a selection of a task from the task marketplace is detected.

From operation 1308, the method 1300 flows to operation 1310 to perform the selected task for the requesting user.

FIG. 14 is a sample UI 1402 for accessing the task marketplace, according to some example embodiments. One goal is for individuals to publish their tasks for others to use, creating a marketplace of saved tasks. While the creator of the task may be the primary user, other users can also benefit from these tasks.

In the task marketplace, users who understand how these tasks operate can utilize them. The LCIEE allows for the execution of tasks without the need to view the code or the plan behind the task.

In the illustrated example, the UI 1402 show a list of available tasks in a table 1404, and the user can scroll down the page to see additional tasks. For each available task, the corresponding row in the table 1404 includes the task name, a task description, input (if any) for the task, output expected after executing the task, and the creator of the task. Additional information may also be included, such as when the task was created, last time the task was executed, number of times the task has been executed, dependencies (e.g., access to email service), etc.

Some of the tasks are provided by the system (e.g., universal_writer and data_extractor), and other tasks have been created by users. When a user selects a task, a new UI will be presented with information about the task and options to enable the user to enter required inputs, credentials, etc. Further, an option is provided to request execution of the task, and when selected, the task will be executed by the LCIEE.

Figure 15:
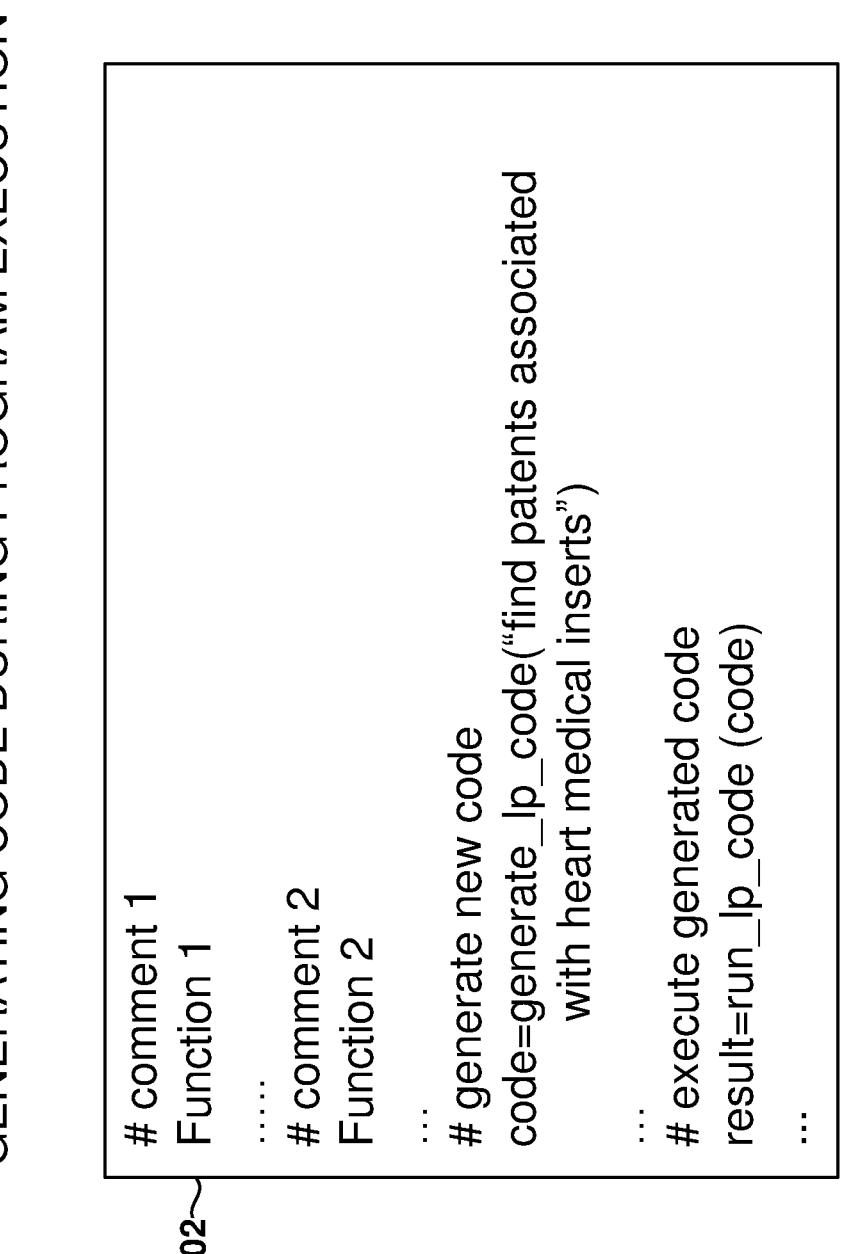
FIG. 15 illustrates the option to generate additional code during execution of the code and then executing the additional code, according to some example embodiments.

FIG. 15 illustrates the option to generate additional code during execution of the code and then executing the additional code, according to some example embodiments. Another feature of LCIEE is ability to generate code "on the fly" (e.g., while the code is being executed) and run the generated code without having to interrupt the running code.

In the illustrated example, code 1502 is being executed, and the code 1502 includes a list of operations (e.g., function 1, function 1), with their corresponding comments.

There is a special function named generate_lp_code that allows LCIEE to generate code and another special function named run_lp_code that can execute the code generated by generate_lp_code. That is, the output of generate_lp_code is a block of code, and the input to run_lp_code is the code.

For example, an operation could be to generate code to "find patents associated with heart medical inserts." The code generator would be used to generate this code, and then the code generated would be executed by the LP executer 902.

Thus, LCIEE can, during execution, generate code and run that generated code recursively within itself.

FIG. 16 is another example of the generation of the plan. Some prompt may ask for requests that are very complex, so LCIEE may perform several cycles for generating operations, where an operation generated in one cycle may be expanded into a list of sub-operations in the next cycle, until the code is generated for some of the operations and sub-operations.

As used herein, an operation that is submitted for the creation of code is referred to as an atomic operation, while operations that are used as a new prompt to generate a sequence of suboperations are referred to as decomposable operations.

In the illustrated example, the user has submitted an ambitious request, "Think of ideas for a world-changing impactful app, then pick one. You will implement it today. You can make all decisions, do a great job!" LCIEE generated the following plan:

1. Generate a list of 10 well-changing impactful app ideas.
2. Gather information about existing solutions and competitors for each app idea.
3. Analyze the search results and evaluate the potential impact, feasibility, and uniqueness of each app idea.
4. Rank the app ideas based on the analysis from step 3.
5. Select the top-ranked app idea as the final choice.
6. Create a document outlining the chosen app idea, its potential impact, and the reasons for selecting it.
7. Create a detailed implementation plan for the chosen app idea.
8. Send a chat message to the CEO with a summary of the chosen app idea, its potential impact, and a link to the implementation plan document.
9. Begin executing the implementation plan as outlined in the document.

It can be seen that many, if not all, of these operations are complex so they can be decomposed into simpler operations, e.g., operation 7 that recites "Create a detailed implementation plan for the chosen app idea."

FIG. 17 shows a document generated by the plan, according to some example embodiments. With the plan described in FIG. 16, LCIEE generated three documents: a first document with app ideas, a second document with the chosen idea (shown in part in FIG. 17), and a third document with the implementation plan (shown in FIG. 18). The documents may be saved in any format that supports text, such as Microsoft Word, Google doc, plain text, RTF, etc.

In addition to the three created documents, the initial prompt presented in FIG. 16, generated the following results in the UI describing the chosen app idea:

Summary of chosen app idea:

The app is a platform that connects volunteers with local organizations in need of help. Its main features include a search function for volunteer opportunities, a messaging system for communication between volunteers and organizations, and a tracking system for volunteer hours. The target audience is individuals who are interested in volunteering and local organizations that need volunteers. The potential impact of the app is significant, as it could increase volunteerism and help organizations fill their volunteer needs more efficiently. However, the app may face challenges in ensuring the safety and reliability of volunteers and organization.

In this example, LCIEE came up with the following list of impactful app ideas described in the first document:

1. An app that connects volunteers with local organizations in need of help
2. A mental health app that provides resources and support for those struggling with mental illness 3. An app that helps people reduce their carbon footprint by tracking their daily habits and suggesting eco-friendly alternatives
4. A language learning app that connects native speakers with learners for conversation practice
5. An app that helps people find and book affordable housing in their area
6. A food waste reduction app that connects users with local food banks and charities
7. An app that helps people track and reduce their screen time for improved mental health After generating these ideas, each idea is treated as a new prompt, and LCIEE explores the idea. For example, LCIEE performs research on the feasibility and plans for implementing the idea, as well as the potential impact.

Eventually, LCIEE selects one of the ideas, as defined in operation 5 of the first-level plan, and creates the second document as defined in operation 6 to describe the chosen idea. Part of the second document is illustrated in FIG. 17. In this example, the second document describing the chosen app includes the following:

Chosen App Idea:

1. An app that connects volunteers with local organizations in need of help

Potential Impact: Based on the provided information, there are already several establish platforms and apps that connect volunteers with organizations, such as VolunteerMatch POINT, and Golden Volunteer Opportunities. However, there is still potential for a new app that focuses on connecting volunteers with virtual opportunities, as seen with Volunteer From Your Couch. The target audience would be individuals looking to donate their time and skills to various causes. The app should have features that allow users to easily search for and apply to volunteer opportunities, track their volunteer hours, and communicate with the organizations they are working with. The revenue model could be based on a subscription fee for organizations to post volunteer opportunities or a percentage of donations made through the app. The main challenge would be standing out among the existing competition and gaining traction in the market. However, with a unique and user friendly interface, effective marketing strategies, and partnerships with reputable organizations, the app could have potential for growth and success.

Purpose: To connect volunteers with local organizations in need of help.

Target audience: Individuals looking to volunteer in their community.

Features and functionalities:

User registration and logging

Volunteer opportunities search and filtering

Volunteer opportunity details and sign-up

Organization registration and login

Organization profile creation and management

Volunteer management and communication

In-app messaging system

Rating and review system

Push notifications

Timeline:

Planning and research: 1 month

Design and prototyping: 2 months

Development: 6 months

Testing and quality assurance: 1 month

Development team roles and responsibilities:

Project manager: oversees the entire project and ensures deadlines are met

. . .

Link to implementation plan: implementation_plan.docx

As seen in the last line, a separate document has been created for the implementation plan and a link is provided.

FIG. 18 provides details on the implementation plan, according to some example embodiments. The implementation plan includes the following:

The plan is to:

1. Generate search queries related to user registration and login best practices.
2. Perform a general search using the generated queries.
3. Extract URLs from the search results.
4. Get the content of each website and summarize the best practices for user registration and login.
5. Save the summaries in a document.
6. Rank the best practices based on their relevance and effectiveness.
7. Select the top-ranked idea.
8. Create an outline for implementing the final choice.
9. Save the outline in a document.
10. Generate an implementation plan based on the outline.
11. Save the implementation plan in a document.
12. Create a summary of the implementation plan.
13. Break down the implementation plan into a list of tasks.
14. Send the tasks to the user.
15. Return the summary.

. . .

Further, in this example, LCIEE generates a plan to execute the implementation plan, as follows:

The plan is to:

1. Read an implementation plan document.
2. Extract a list of tasks from the implementation plan document.
3. Split the list of tasks into individual tasks.
4. Execute each task using natural language processing.
5. Send a chat message to the user indicating that each task has been completed.
6. Send a final chat message to the user indicating that the implementation plan has been successfully executed.

Reading document at implementation_plan.docx

Generating content for task: extract a list of tasks

. . .

Then LCIEE continues with the execution by performing the different operations within the plan. For example, one of the operations in the plan is related to user registration and login best practices. LCIEE generated the following document regarding login best practices:

Here are some best practices for user registration and login:

1. Allow sign-up with social media accounts for one-click registration.
2. Don't ask for password confirmation.
3. Use password strength indicators to encourage users to create strong passwords.
4. Implement multi-factor authentication for added security.
5. Use HTTPS to encrypt user data during transmission.
6. Implement rate limiting to prevent brute force attacks.
7. Use password managers to securely store user passwords.
8. Provide clear and concise error messages to help users troubleshoot issues.
9. Use user-friendly interfaces that are easy to navigate.

10. Consider accessibility considerations for user with disabilities.
11. Implement a secure password reset process that requires additional verification.
12. Manage user data securely and transparently, following data protection regulations.

LCIEE proceeds to perform all these operations until the complete plan is determined. As described, LCIEE generates plans that grow in specificity, going from more general to more specific. Some of the plans are complex, so LCIEE recursively uses some operations like a prompt to break down a complex operation into simpler operations, until all the operations may be performed executing code.

The benefit of LCIEE recursively improving a plan is that LCIEE retains the environment that the code is running on, including any internal variables and other functions used in the process.

Figure 19:
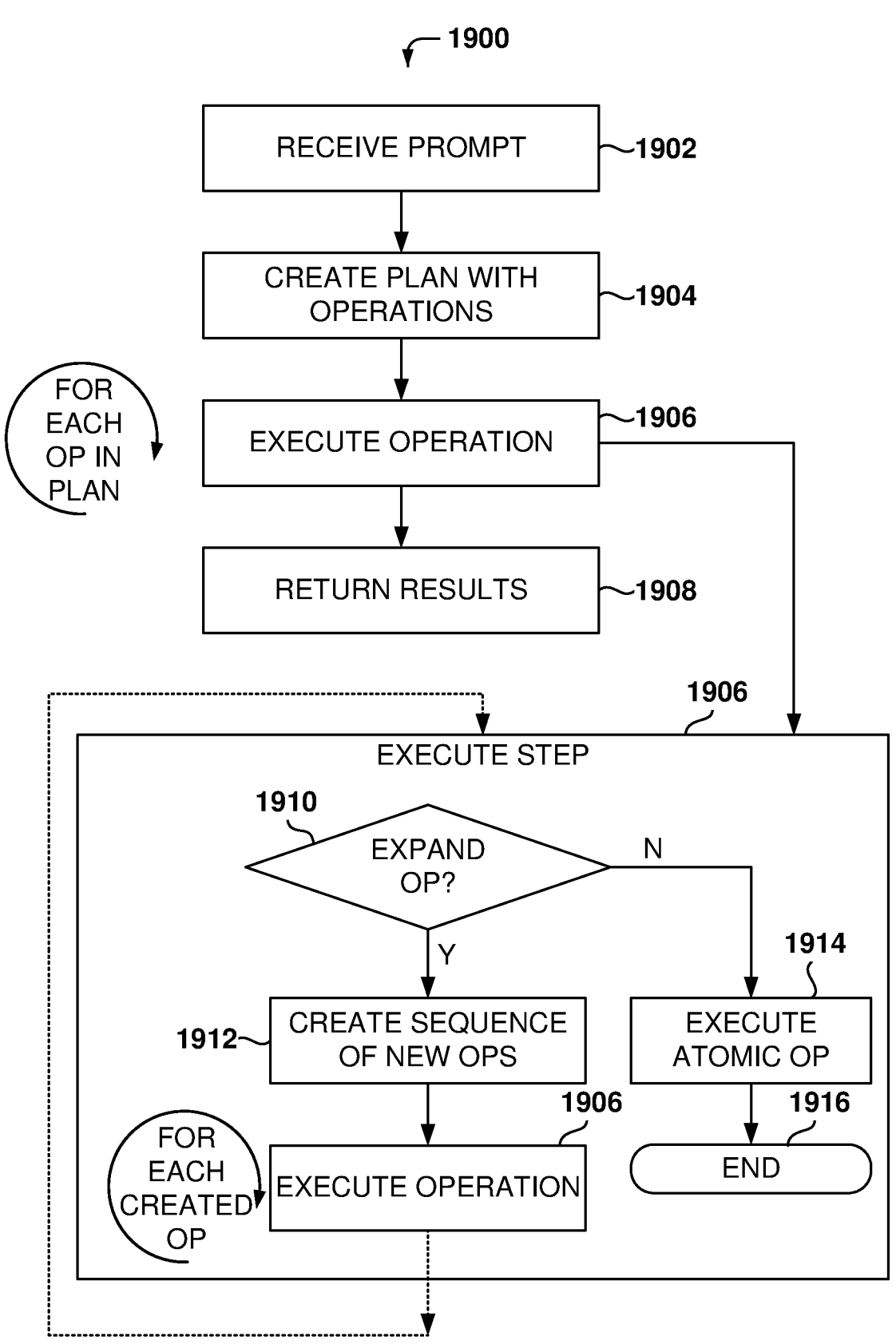
FIG. 19 is a flowchart of a method that uses recursiveness to expand operations into a plurality of sub-operations, according to some example embodiments.

FIG. 19 is a flowchart of a method 1900 that uses recursiveness to expand operations into a plurality of sub-operations, according to some example embodiments.

Operation 1902 is for receiving a prompt from the user. From operation 1902, the method 1900 flows to operation 1904 where a plan is created, and the plan includes operations. The operations could be atomic operations or decomposable operations that can be used to generate other sub-operations.

From operation 1904, the method 1900 flows to operation 1906 to execute the operation. Within operation 1906, operation 1910 is used to perform a check to determine if the operation being executed should be expanded. If the operation is an atomic operation and does not have to be expanded, the method flows to operation 1914 to execute the atomic operation, which is considered the end (operation 1916) for executing the operation 1906.

However, if the operation is a decomposable operation that needs to be expanded, the method flows to operation 1912 to create a new sequence of operations to perform this operation, that is, create sub-operations. All the created sub-operations are then executed recursively within operation 1906, which in turn could be decomposable or atomic.

After all the recursions are performed and all the operations executed, the method 1900 flows to operation 1908 to return the results to the user and present the results in the UI.

FIG. 19 shows that the operations of a plan can be recursively used to generate sub-operations (also called subplans) and then continue with the sub-operations. This way, very complex tasks can be decomposed in smaller, simpler tasks that are easily coded for execution.

FIG. 20 is a flowchart of a method for implementing a tool that generates and executes the code in a controlled environment to satisfy user requests entered as text prompts, according to some example embodiments.

Operation 2002 is for receiving a user prompt with a user request received in a UI;

From operation 2002, the method 2000 flows to operation 2004 to generate generating a first LLM prompt to create a plan to perform the user request.

From operation 2004, the method 2000 flows to operation 2006 for receiving the plan from an LLM that received the first LLM prompt, the plan comprising text describing a sequence of operations.

From operation 2006, the method 2000 flows to operation 2008 to generate a second LLM prompt to create code, the second LLM prompt specifying which code instructions are permitted in the created code.

From operation 2008, the method 2000 flows to operation 2010 for receiving the code from the LLM that received the second LLM prompt, the code comprising instructions executable by a computer processor.

From operation 2010, the method 2000 flows to operation 2012 for executing the code in a controlled environment, the executing the code comprising detecting an error when executing a function of the code, generating new code for the function that caused the error, and executing the new code for the function that caused the error.

From operation 2012, the method 2000 flows to operation 2014 to cause presentation in the UI of results generated by executing the code.

In one example, the method 2000 further comprises detecting that credentials to access an external tool are required to satisfy the user request, and presenting in the UI a request to obtain the credentials.

In one example, the method 2000 further comprises detecting that a parameter value is needed to satisfy the user request, and presenting in the UI a request to obtain the parameter value.

In one example, the parameter value is an email address, wherein the UI presents a request for the email address.

In one example, the method 2000 further comprises providing feedback on the UI about progress while executing the code, the feedback comprising information based on comments associated with function calls in the code.

In one example, the first LLM prompt comprises: information on data classes, functions, and libraries that can be referenced, tools available to be used in the plan, instructions for the LLM to generate the plan, and the user request.

In one example, the second LLM prompt comprises: information on data classes that can be referenced, libraries available, functions that may be used in the code, instructions for the LLM to generate the plan, and the plan.

In one example, the first prompt provides instructions to use a text generation function with inputs of a task to be performed and a context and generates an output with information requested in the inputs.

In one example, credentials required to access resources excluded from the code.

In one example, executing the code further includes executing a function to obtain information from another computer using an Application Programming Interface (API), and transforming the information received in response to executing the function based on requirements to execute other functions within the code.

Another general aspect is for a system that includes a memory comprising instructions and one or more computer processors. The instructions, when executed by the one or more computer processors, cause the one or more computer processors to perform operations comprising: receiving a user prompt with a user request received in a user interface (UI); generating a first Large Language Model (LLM) prompt to create a plan to perform the user request; receiving the plan from an LLM that received the first LLM prompt, the plan comprising text describing a sequence of operations; generating a second LLM prompt to create code, the second LLM prompt specifying which code instructions are not allowed to create the code; receiving the code from the LLM that received the second LLM prompt, the code comprising instructions executable by a computer processor; executing the code in a controlled environment, the executing the code comprising: detecting an error when executing a function of the code; generating new code for the function that caused the error; and executing the new code for the function that caused the error; and causing presentation in the UI of results generated by executing the code.

In yet another general aspect, a non-transitory machine-readable storage medium (e.g., a non-transitory storage medium) includes instructions that, when executed by a machine, cause the machine to perform operations comprising: receiving a user prompt with a user request received in a user interface (UI); generating a first Large Language Model (LLM) prompt to create a plan to perform the user request; receiving the plan from an LLM that received the first LLM prompt, the plan comprising text describing a sequence of operations; generating a second LLM prompt to create code, the second LLM prompt specifying which code instructions are not allowed to create the code; receiving the code from the LLM that received the second LLM prompt, the code comprising instructions executable by a computer processor; executing the code in a controlled environment, the executing the code comprising: detecting an error when executing a function of the code; generating new code for the function that caused the error; and executing the new code for the function that caused the error; and causing presentation in the UI of results generated by executing the code.

Figure 21:
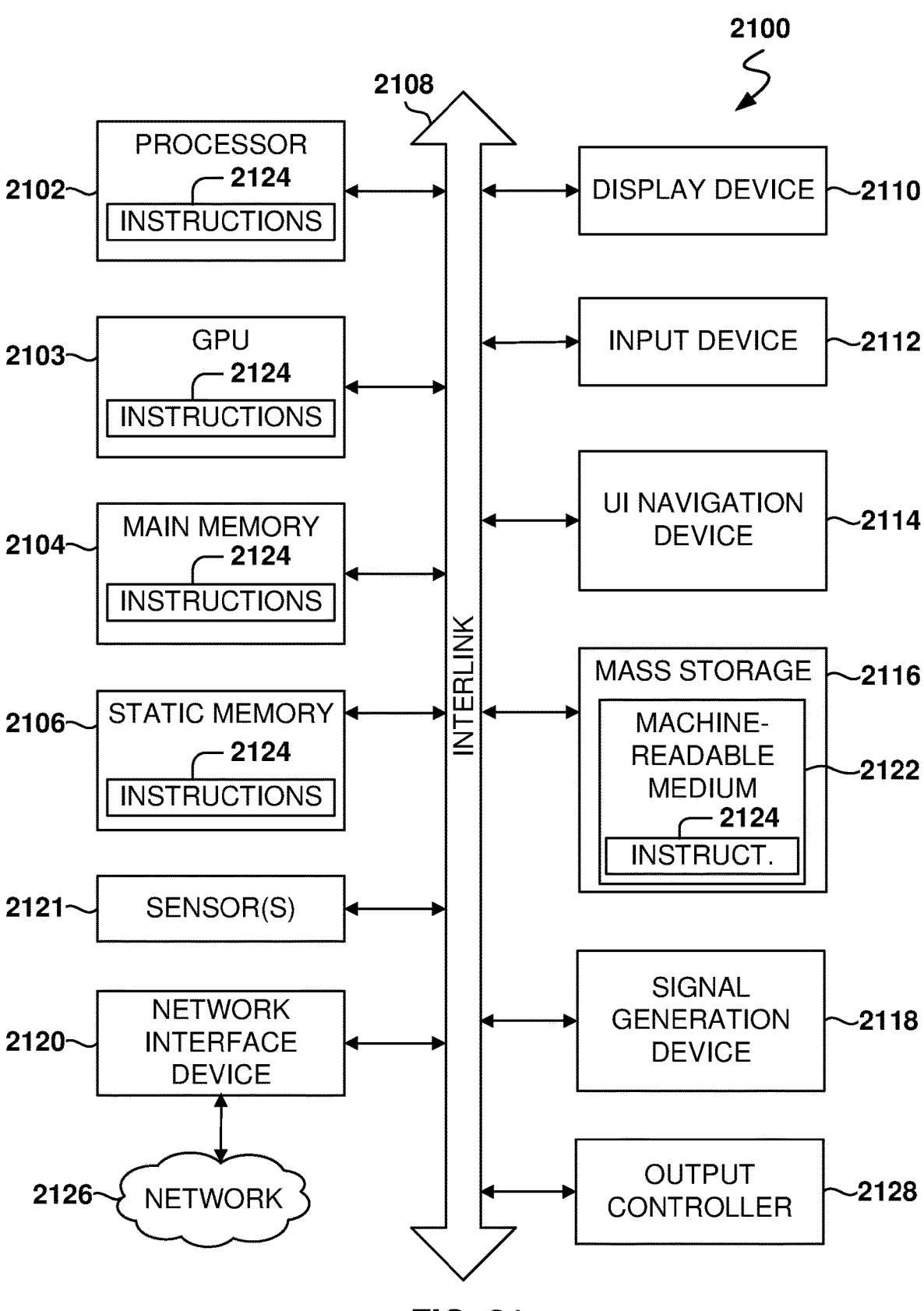
FIG. 21 is a block diagram illustrating an example of a machine upon or by which one or more example process embodiments described herein may be implemented or controlled.

FIG. 21 is a block diagram illustrating an example of a machine 2100 upon or by which one or more example process embodiments described herein may be implemented or controlled. In alternative embodiments, the machine 2100 may operate as a standalone device or may be connected (e.g., networked) to other machines. In a networked deployment, the machine 2100 may operate in the capacity of a server machine, a client machine, or both in server-client network environments. In an example, the machine 2100 may act as a peer machine in a peer-to-peer (P2P) (or other distributed) network environment. Further, while only a single machine 2100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 2100 (e.g., computer system) may include a hardware processor 2102 (e.g., a central processing unit (CPU), a hardware processor core, or any combination thereof), a graphics processing unit (GPU 2103), a main memory 2104, and a static memory 2106, some or all of which may communicate with each other via an interlink 2108 (e.g., bus). The machine 2100 may further include a display device 2110, an alphanumeric input device 2112 (e.g., a keyboard), and a user interface (UI) navigation device 2114 (e.g., a mouse). In an example, the display device 2110, alphanumeric input device 2112, and UI navigation device 2114 may be a touch screen display. The machine 2100 may additionally include a mass storage device 2116 (e.g., drive unit), a signal generation device 2118 (e.g., a speaker), a network interface device 2120, and one or more sensors 2121, such as a Global Positioning System (GPS) sensor, compass, accelerometer, or another sensor. The machine 2100 may include an output controller 2128, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 2116 may include a machine-readable medium 2122 on which is stored one or more sets of data structures or instructions 2124 (e.g., software) embodying or utilized by any one or more of the techniques or functions described herein. The instructions 2124 may also reside, completely or at least partially, within the main memory 2104, within the static memory 2106, within the hardware processor 2102, or within the GPU 2103 during execution thereof by the machine 2100. In an example, one or any combination of the hardware processor 2102, the GPU 2103, the main memory 2104, the static memory 2106, or the mass storage device 2116 may constitute machine-readable media.

While the machine-readable medium 2122 is illustrated as a single medium, the term "machine-readable medium" may include a single medium, or multiple media, (e.g., a centralized or distributed database, and/or associated caches and servers) configured to store the one or more instructions 2124.

The term "machine-readable medium" may include any medium that is capable of storing, encoding, or carrying instructions 2124 for execution by the machine 2100 and that cause the machine 2100 to perform any one or more of the techniques of the present disclosure, or that is capable of storing, encoding, or carrying data structures used by or associated with such instructions 2124. Non-limiting machine-readable medium examples may include solid-state memories, and optical and magnetic media. In an example, a massed machine-readable medium comprises a machine-readable medium 2122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2124 may further be transmitted or received over a communications network 2126 using a transmission medium via the network interface device 2120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:

generating first code, using a Large Language Model (LLM), to execute a first plan created to implement a first user request entered as a user prompt in a User Interface (UI), the first code comprising instructions executable by a computer processor;

executing the first code in a controlled environment;

providing an option in the UI to save the executed first code based on a successful execution of the first code;

in response to a selection of the option to save the executed first code, saving the executed first code as a first task in a task marketplace, wherein saving the executed first code as a first task further comprises:

identifying one or more variables associated with the first task; and providing a feature in the UI to name the identified one or more variables, the one or more variables being used as input when executing the first task from the task marketplace;

receiving a second user request via the UI;

generating second code, using the LLM, to execute a second plan created to implement the second user request, wherein the LLM automatically detects and selects tasks from the task marketplace for the second plan, the second plan comprising the first task obtained from the task marketplace, the second code comprising the executed first code obtained from the task marketplace;

executing the second code in the controlled environment; and causing presentation of results from executing the second code.

2. The method as recited in claim 1, wherein the second code comprises the first code from the first task and newly generated code for executing part of the second plan.

3. The method as recited in claim 1, wherein executing the second code further comprises:

presenting in the UI an option to enter values for one or more variables associated with the first task.

4. The method as recited in claim 3, wherein the one or more variables comprise is an email address, wherein the UI presents a request for the email address.

5. The method as recited in claim 1, wherein executing the second code further comprises:

detecting that credentials to access an external tool are required to execute the second code, wherein the credentials required to access resources are excluded from the second code; and presenting in the UI a request to obtain the credentials.

6. The method as recited in claim 1, wherein after saving the first task in the task marketplace, the first task is selectable in the UI to be included in a plan associated with a new user prompt.

7. The method as recited in claim 1, wherein the task marketplace is configured to store tasks created by more than one user, wherein each user configures each task added to the marketplace to be available to other users.

8. The method as recited in claim 1, further comprising:

providing a task UI to select available tasks from the task marketplace, wherein information presented for each task comprises a task name, a task description, input parameters for tasks that require input parameters, and a creator of the task.

9. The method as recited in claim 1, wherein the controlled environment is configured to detect an error during execution of the code and generate new code in response to the detected error, wherein executing the first code in the controlled environment comprises:

detecting a first error when executing a function of the first code;

generating new code for the function that caused the first error; and executing the new code for the function that caused the error.

10. A system comprising:

a memory comprising instructions; and one or more computer processors, wherein the instructions, when executed by the one or more computer processors, cause the system to perform operations comprising:

generating first code, using a Large Language Model (LLM), to execute a first plan created to implement a first user request entered as a user prompt in a User Interface (UI), the first code comprising instructions executable by a computer processor;

executing the first code in a controlled environment;

providing an option in the UI to save the executed first code based on a successful execution of the first code;

in response to a selection of the option to save the executed first code, saving the executed first code as a first task in a task marketplace, wherein saving the executed first code as a first task further comprises:

identifying one or more variables associated with the first task; and providing a feature in the UI to name the identified one or more variables, the one or more variables being used as input when executing the first task from the task marketplace;

receiving a second user request via the UI;

generating second code, using the LLM, to execute a second plan created to implement the second user request, wherein the LLM automatically detects and selects tasks from the task marketplace for the second plan, the second plan comprising the first task obtained from the task marketplace, the second code comprising the executed first code obtained from the task marketplace;

executing the second code in the controlled environment; and causing presentation of results from executing the second code.

11. The system as recited in claim 10, wherein the second code comprises the first code from the first task and newly generated code for executing part of the second plan.

12. The system as recited in claim 10, wherein executing the second code further comprises:

presenting in the UI an option to enter values for one or more variables associated with the first task.

13. The system as recited in claim 10, wherein executing the second code further comprises:

detecting that credentials to access an external tool are required to execute the second code, wherein the credentials required to access resources are excluded from the second code; and presenting in the UI a request to obtain the credentials.

14. A non-transitory machine-readable storage medium including instructions that, when executed by a machine, cause the machine to perform operations comprising:

generating first code, using a Large Language Model (LLM), to execute a first plan created to implement a first user request entered as a user prompt in a User Interface (UI), the first code comprising instructions executable by a computer processor;

executing the first code in a controlled environment;

providing an option in the UI to save the executed first code based on a successful execution of the first code;

in response to a selection of the option to save the executed first code, saving the executed first code as a first task in a task marketplace, wherein saving the executed first code as a first task further comprises:

identifying one or more variables associated with the first task; and providing a feature in the UI to name the identified one or more variables, the one or more variables being used as input when executing the first task from the task marketplace;

receiving a second user request via the UI;

generating second code, using the LLM, to execute a second plan created to implement the second user request, wherein the LLM automatically detects and selects tasks from the task marketplace for the second plan, the second plan comprising the first task obtained from the task marketplace, the second code comprising the executed first code obtained from the task marketplace;

executing the second code in the controlled environment; and causing presentation of results from executing the second code.

15. The non-transitory machine-readable storage medium as recited in claim 14, wherein the second code comprises the first code from the first task and newly generated code for executing part of the second plan.

16. The non-transitory machine-readable storage medium as recited in claim 14, wherein executing the second code further comprises:

presenting in the UI an option to enter values for one or more variables associated with the first task.

17. The non-transitory machine-readable storage medium as recited in claim 14, wherein executing the second code further comprises:

detecting that credentials to access an external tool are required to execute the second code, wherein the credentials required to access resources are excluded from the second code; and presenting in the UI a request to obtain the credentials.

18. The method as recited in claim 1, further comprising:

saving the second code as a second task in the task marketplace, the second code comprising the code from the first task and newly generated code.

19. The method as recited in claim 1, wherein the second code includes the first code of the first task from the task marketplace and a second code from a second task from the task marketplace.

* * * * *